United States Patent [19]

Laurito

[11] 4,433,100

[45] * Feb. 21, 1984

[54] PRODUCTION OF NOVEL RESINS AND THEIR USES IN PRINTING INK COMPOSITIONS

[75] Inventor: James J. Laurito, Pittsburgh, Pa.

[73] Assignee: Neville Chemical Company, Pittsburgh, Pa.

[ * ] Notice: The portion of the term of this patent subsequent to Nov. 1, 1994 has been disclaimed.

[21] Appl. No.: 399,003

[22] Filed: Jul. 16, 1982

Related U.S. Application Data

[63] Continuation-in-part of Ser. No. 260,935, May 8, 1981, abandoned, which is a continuation of Ser. No. 40,426, May 18, 1979, abandoned, which is a continuation of Ser. No. 839,408, Oct. 5, 1977, abandoned, which is a continuation of Ser. No. 434,270, Jan. 17, 1974, Pat. No. 4,056,498.

[51] Int. Cl.$^3$ .......................................... C08F 216/06
[52] U.S. Cl. ...................... 525/54.42; 526/238.3; 526/283; 526/290
[58] Field of Search ............... 526/290, 283, 238.3; 525/54.42

[56] References Cited

U.S. PATENT DOCUMENTS

| | | | |
|---|---|---|---|
| 3,211,681 | 10/1965 | Arakawa et al. | 260/23 |
| 3,887,641 | 6/1975 | Tsuchiya et al. | 260/78.40 |
| 3,943,111 | 3/1976 | Fritze et al. | 260/78.4 |
| 3,984,381 | 10/1976 | Tsuchiya et al. | 260/78.41 |
| 4,013,609 | 3/1977 | Hultzsch et al. | 260/33.6 UA |
| 4,028,119 | 6/1977 | Yamada et al. | 106/32 |
| 4,056,498 | 11/1977 | Laurito | 526/290 |
| 4,079,102 | 3/1978 | Wagner et al. | 260/879 |
| 4,087,483 | 5/1978 | Geerdes | 260/879 |
| 4,092,283 | 5/1978 | Oishi et al. | 260/27 BB |
| 4,189,410 | 2/1980 | Laurito | 526/290 |
| 4,197,378 | 4/1980 | Rudolphy et al. | 525/134 |
| 4,244,866 | 1/1981 | Schefbauer | 260/23.7 C |
| 4,256,619 | 3/1981 | Miyaguchi et al. | 260/23.7 C |
| 4,292,221 | 9/1981 | Malatesta | 260/23.7 C |
| 4,301,055 | 11/1981 | Schefbauer | 260/33.6 R |

FOREIGN PATENT DOCUMENTS

| | | |
|---|---|---|
| 21642 | 1/1981 | European Pat. Off. . |
| 55-60573 | 5/1980 | Japan . |

*Primary Examiner*—Melvyn I. Marquis
*Attorney, Agent, or Firm*—Thomas F. McKnight; Walter H. Williams

[57] ABSTRACT

Synthetic resins suitable for use in printing ink compositions are produced by reacting a mixture consisting essentially of (a) a predominant amount of dicyclopentadiene and lesser amounts of (b) at least one hydrocarbon selected from the group consisting of monoolefins, diolefins, and polyenes each having more than five carbon atoms, and having no aromatic rings, and (c) at least one member selected from the group consisting of fatty acid-containing materials and rosin acid-containing materials. Additional synthetic resins suitable for use in printing ink compositions are produced by reacting components (a) to (c) above with an ethylenically unsaturated lower aliphatic dicarboxylic acid or anhydride, such as maleic anhydride.

40 Claims, No Drawings

PRODUCTION OF NOVEL RESINS AND THEIR USES IN PRINTING INK COMPOSITIONS

CROSS-REFERENCES TO RELATED APPLICATIONS

This application is a continuation in-part of U.S. patent application Ser. No. 260,935, filed May 8, 1981, now abandoned, which is a continuation of U.S. patent application Ser. No. 40,426, filed May 18, 1979, now abandoned, which is a continuation of U.S. patent application Ser. No. 839,408, filed Oct. 5, 1977, now abandoned, which is a continuation of U.S. patent application Ser. No. 434,270 filed Jan. 17, 1974, now U.S. Pat. No. 4,056,498 issued Nov. 1, 1977, all of which are herein incorporated by reference.

BACKGROUND OF THE INVENTION

1. Field of the Invention

This invention relates generally to synthetic resins suitable for printing ink compositions and to processes for their production.

2. Summary of the Prior Art

Hydrocarbon resins suitable for a wide variety of end uses including coatings, asphalt floor tile, and printing ink compositions have been known for many years. See, for example, U.S. Pat. Nos. 2,598,424; 3,290,275; 3,299,034; 3,468,837; 3,523,095 and 3,775,381; and "Recent Developments in Hydrocarbon Resins", K. E. Jackson, Official Digest, pp. 372–385, May, 1956; and "Synthetic Resins for Inks", John P. Petrone, The American Inkmaker, Vol. 49, (March–Oct., 1971).

The search has continued, however, for new synthetic resins having improved properties, particularly in the printing ink industry, which has searched for a suitable replacement for rosin and rosin derivatives in heat-set and gravure printing ink compositions. The present invention was made as a result of that search.

SUMMARY OF THE INVENTION

Accordingly, a primary object of the present invention is to provide novel synthetic resins suitable for use in compositions such as printing inks.

Another object of the present invention is to provide novel processes for producing synthetic resins suitable for use in compositions such as printing inks.

These and other objects will be apparent to one skilled in this art from the following:

In accordance with one aspect of the present inventions a composition and a process for producing said composition suitable for use in heat-set and gravure ink printing compositions comprising:

(a) a predominant amount of dicyclopentadiene; and lesser amounts of (b) at least one hydrocarbon selected from the group consisting of mono-olefins, diolefins, and polyenes each having more than 5 carbon atoms, and having no aromatic rings; and (c) at least one member selected from the group consisting of fatty acid-containing materials and rosin acid-containing materials is provided.

In a more particular aspect of the present invention, a composition and a process for producing a composition suitable for use in heat-set and gravure ink printing compositions comprising a polymerized mixture of components (a), (b) and (c) above are also provided. The composition has a Ring and Ball softening point of from about 100° C. to about 170° C., preferably from about 125° C. to about 150° C.; Gardner-Holdt solution viscosities at 25° C. (bubble seconds) of from about 0.90 to about 15.0, preferably from about 1.15 to about 8.00 (60%/Wt. resin in 42 Kauri butanol gravure ink solvent) and from about 8.00 to about 100, preferably from about 10 to about 50 (50%/Wt. resin in Magie 470 oil); a definite Stoddard solubility from less than about −60° C. to about 40° C., preferably from about −50° C. to about +20° C.; and an Acid Number of from about 1.5 to about 10.0, preferably from about 3.0 to about 7.0.

In another aspect of the present invention, a composition and a process for producing a composition suitable for use in heat-set and gravure ink printing compositions comprising:

(a) a predominant amount of dicyclopentadiene; and lesser amounts of (b) at least one hydrocarbon selected from the group consisting of mono-olefins, diolefins, and polyenes each having more than 5 carbon atoms, and having no aromatic rings;

(c) at least one member selected from the group consisting of fatty acid-containing materials and rosin acid-containing materials; and (d) at least one ethylenically unsaturated lower aliphatic dicarboxylic acid or anhydride is provided.

In another more particular aspect of the present invention, a composition suitable for use in heat-set and gravure ink printing compositions comprising the reaction product of components (a), (b), (c) and (d) above is provided. The composition has a Ring and Ball softening point of from about 110° C. to about 180° C., preferably from about 130° C. to about 175° C., and most preferably from about 140° C. to about 160° C.; Gardner-Holdt solution viscosities at 25° C. (bubble seconds) of from about 10 to about 10,000, preferably from about 100 to about 2,000, and most preferably from about 200 to about 1200 (60%/Wt. resin in 33–34 Kauri butanol reference oil-H.D.T.); a hydrocarbon dilution tolerance test value (solubility-Wt. %) of from about 25 to about 1000, preferably from about 50 to about 600, and most preferably from about 125 to about 250 (60%/Wt. resin in 33–34 Kauri butanol reference oil-H.D.T.); and an Acid Number of from about 10 to about 40, preferably from about 10 to about 30, and most preferably from about 15 to about 25. Processes for producing said composition comprising reacting components (a), (b), (c) and (d), either simultaneously in a one-step reaction process or as a two-step reaction process whereby components (a) to (c) are co-polymerized to form a base resin and said base resin is thereafter reacted with component (d), and also provided.

The central feature of the present invention is the discovery of a novel synthetic resin having properties desirable for use in printing ink compositions, including heat-set and gravure inks. The properties include (i) reasonably high softening points; (ii) light color, e.g., up to about 3, and more typically up to about 2 (Barrett method), or between about 9 and about 15 (Gardner method); (iii) reasonably high solubility in the relatively poor solvents typically used in inks, e.g., Magie 470 oil (heat-set) or 42 Kauri butanol gravure ink solvent; (iv) the ability to "wet" pigments in ink formulae (thought to be a function of the Acid Number of the resin); and (v) a reasonably high solution viscosity in relatively low solvent power ink solvents at 50% to 60% resin concentration (the importance of the property is pointed out by the fact that in certain instances the ink industry requires a relatively viscous paste ink consistency for application, and in other instances may wish a substantially less viscous ink formulation). The resins of the present invention generally exhibit a high level and wide range of solubility-compatibility properties. Moreover, the resins of the present invention can be used as the sole resin or in combination with or as an extender for other resins in both heat-set ink compositions and gravure ink compositions. And in such printing ink compositions, the resins of the present invention have also been found to give improved solvent release and improved gloss, as well as giving excellent ink drawdowns (Meyer Bar), and decreased odor. The resins of the present invention are also useful when incorporated into a gelled varnish formulation, e.g., with an ink oil and gelling agent. Other aspects and advantages of the present invention will become apparent to one skilled in this art from the following description of the preferred embodiments.

DESCRIPTION OF THE PREFERRED EMBODIMENTS

The novel synthetic resins described in applicant's U.S. Pat. No. 4,056,498 are produced by a process including forming a base resin by polymerizing a reaction mixture consisting essentially of (a) a predominant amount of dicyclopentadiene and lesser amounts of (b) a mixture of dimerized conjugated aliphatic cyclic and non-cyclic dienes of five carbon atoms, and (c) tall oil.

As taught by applicant in U.S. Pat. No. 4,189,410, the novel synthetic resins may also be produced by a process including forming a base resin by polymerizing a reaction mixture consisting essentially of (a) a predominant amount of dicyclopentadiene and lesser amounts of (b) at least one hydrocarbon-containing material selected from the group consisting of debutanized aromatic concentrates, C-5 olefins, and acyclic, conjugated C-5 dienes and (c) at least one member selected from the group consisting of fatty acid-containing materials and rosin acid-containing materials.

In the present invention, the novel synthetic resins are typically produced by a process including forming a base resin by polymerizing a reaction mixture comprising (a) a predominant amount of dicyclopentadiene (hereinafter referred to as DCPD) and lesser amounts of (b) at least one hydrocarbon selected from the group consisting of mono-olefins, diolefins and polyenes each having more than five carbon atoms and having no aromatic rings; and (c) at least one member selected from the group consisting of fatty acid-containing materials and rosin acid-containing materials.

Applicant's U.S. Pat. No. 4,056,498 describes the first principal component, dicyclopentadiene (Component "a"), as being well known per se. A substantially pure, e.g., 95 percent to essentially 100 percent, dicyclopentadiene feed stock may be used. Alternatively, dicyclopentadiene-rich hydrocarbon fractions may also be used. Typically such dicyclopentadiene-rich hydrocarbon fractions contain at least about 40 percent, and more typically at least about 70 percent dicyclopentadiene and minor or lesser amounts, e.g., from about 1 percent to about 30 percent by weight of dimethyldicyclopentadienes and codimers of cyclopentadiene and methylcyclopentadiene. Small amounts, e.g., less than about 5 percent, of other materials such as benzene, and which do not materially affect the performance of the dicyclopentadiene-rich hydrocarbon fractions as used in the present invention, may also be present in such dicyclopentadiene-rich hydrocarbon fractions.

As also indicated above, the dicyclopentadiene is present in the initial reaction mixture is a predominate amount, i.e., in an amount greater than either of the other two principal components of the reaction mixture. For example, the dicyclopentadiene may be present in the reaction mixture in an amount from about 40 percent to about 85 percent, and more preferably in an amount from about 50 percent to about 75 percent, based on the total weight of the three principal components in the reaction mixture.

Applicant has taught in U.S. Pat. No. 4,189,410, which is a continuation in-part of U.S. patent Ser. No. 839,408, filed Oct. 5, 1977, which is a continuation of U.S. patent application Ser. No. 434,270, filed Jan. 17, 1974, now U.S. Pat. No. 4,056,498 issued Nov. 1, 1977 that it may also be possible to employ as the first principal component essentially 100 percent by weight of methyldicyclopentadiene or dimethyldicyclopentadienes. Other materials may be present in the dicyclopentadiene-rich hydrocarbon fraction in amounts which do not materially affect the performance of the dicyclopentadiene-rich hydrocarbon fraction as used in the present invention. Other materials which may be present include, e.g., aromatic olefinic monomers such as vinyltoluenes, styrene, alphamethylstyrene, indene, coumarone, methylcoumarone, dimethylstyrenes and methylindenes, other inert aromatic hydrocarbons such as benzene, toluene, C-8 aromatics, cumene, ethyltoluenes, 1,2,4-trimethylbenzene, 1,2,3-trimethylbenzene, 1,3,5-trimethylbenzene, indane and naphthalene, various inert non-aromatic hydrocarbons, and diolefinic cyclic hydrocarbons such as C-5 codimers and C-4-C-5 codimers including vinylnorbornenes. Generally, the aromatic olefinic monomers should be present in the dicyclopentadiene-rich hydrocarbon feed stream in an amount such that there is present in the improved resins of the present invention less than about 35 weight percent reacted or combined aromatic olefinic monomers based on the total weight of the resin. The inert material, including inert aromatic hydrocarbons and inert non-aromatic hydrocarbons, may be present in the dicyclopentadiene-rich hydrocarbon fraction in an amount of less than about 30 weight percent based on the total weight of the three principal components of the reaction mixture including inerts. The phrase "inert" is used herein to designate hydrocarbon materials which, while they may be involved in some side reactions during the production of the resins of the present invention, are not involved in the reactions which directly result in production of those resins. Preferably, such inerts are present in amounts less than about 15 weight percent. Typically, non-aromatic inert hydrocarbons are preferred. The diolefinic cyclic hydrocarbons may be present in amounts up to about 15 weight percent based on the total weight of the first principal component. As also indicated above, the first principal component is present in the initial reaction mixture in a predominant amount, i.e., in an amount greater than either of the other two principal components of the reaction mixture. For example, the first principal component may be present in a predominant amount in the reaction mixture, i.e., in an amount from about 40 percent to about 85 percent or more, preferably in an amount of from about 50 percent to about 75 percent, based on the total weight of the three principal components in the reaction mixture.

In the present invention, the first principal component, dicyclopentadiene (Component "a"), is of the same composition and is used in the same amounts as that previously described and disclosed in applicant's U.S. Pat. Nos. 4,056,498 and 4,189,410.

Applicant's U.S. Pat. No. 4,056,498 discloses that the second principal component (Component "b") in the initial reaction mixture may be itself a mixture of dimerized conjugated aliphatic, cyclic and noncyclic dienes of five carbon atoms, e.g., a mixture consisting essentially of dimers of isoprene, cis-piperylene and trans-piperylene and codimers, trimers and cotrimers of isoprene, cis-piperylene, transpiperylene and cyclopentadiene. More particularly, a typical second component mixture may consist essentially of from about 70 percent to about 90 percent dimers of isoprene, cis-piperylene and transpiperylene and codimers, trimers and cotrimers of isoprene, cis-piperylene, transpiperylene and cyclopentadiene and from about 30 percent to about 10 percent higher polymers of isoprene, cis-piperylene, trans-piperylene and cyclopentadiene. Feed stocks of this type are described in more detail in U.S. Pat. No. 3,290,275 and U.S. Pat. No. 3,478,005, both of which are incorporated herein by reference.

The dimerized C-5 diene mixture is typically present in an amount substantially less than the dicyclopentadiene component. For example, the dimerized C-5 diene mixture may be present in an amount from about 5 percent to about 30 percent, and more preferably from about 5 percent to about 20 percent, of the total weight of the three principal components in the initial reaction.

Applicant has taught in U.S. Pat. No. 4,189,410, that it may also be possible to employ as the second principal component (Component "b") in the initial reaction mixture at least one hydrocarbon-containing material selected from the group consisting of debutanized aromatic concentrates, C-5 olefins and acylic, conjugated C-5 dienes. More particularly, debutanized aromatic concentrates as contemplated herein include Debutanized Aromatic Concentrate-B (DAC-B) and Debutanized Aromatic Concentrate-C (DAC-C). DAC-B is a complex mixture of saturated, unsaturated and aromatic hydrocarbons having an initial boiling point greater than about 60° C. Typically, DAC-B contains from about 87 percent to about 91 percent carbon and from about 9 percent to about 13 percent hydrogen and has an iodine number ranging from about 195 to about 350. DAC-B contains approximately 70 different compounds, including toluene, mixed xylenes, styrene, 5-methyl-bicyclohept-2-ene and 6-methylene-5-methyl-bicyclohept-2-ene.

Typically, DAC-B may comprise a mixture of aromatics, olefins and paraffins. One typical analysis of DAC-B is set out in Table 1 herein. This analysis includes a determination of the typical major components and typical properties of DAC-B.

TABLE I

| | Percent (Volume) |
|---|---|
| TYPICAL MAJOR COMPONENTS | |
| Paraffins (Normal and Iso) | 2.31 |
| Naphthenes | 8.68 |
| Benzene | 1.07 |
| Toluene | 10.70 |
| C-7 Triolefins and/or Dicyclic | 11.77 |
| Xylenes | 8.02 |
| Ethylbenzene | 3.69 |
| Ortho-Xylene | 1.44 |

TABLE I-continued

| | Percent (Volume) |
|---|---|
| Meta-Xylene | 1.94 |
| Para-Xylene | 0.95 |
| C-8 Triolefins and/or Dicyclic Olefins | 10.70 |
| C-9 Benzenes | 5.34 |
| C-9 Triolefins and/or Dicyclic Olefins | 10.70 |
| TYPICAL PROPERTIES | |
| ASTM Distillation Range (100 ml. sample) (ASTM D 850, herein incorporated by reference) | |
| First Drop | Approx. 119° C. |
| 10 ml. | Approx. 146° C. |
| 50 ml. | Approx. 193° C. |
| 98 ml. | Approx. 315° C. |
| Residue | Approx. 5 ml. |
| Color, Varnish Scale | Approx. 6 |
| Specific Gravity, 15.6/15.6° C. | Approx. 0.940 |
| Water Content | Approx. 0.01% |

DAC-B is typically prepared by the pyrolysis of a natural gas stream predominantly comprising propane or propane-ethane mixtures. Thus, the exact composition of DAC-B may vary and is to some extent a function of the natural gas cracking feed and the various operating conditions, e.g., processing temperature, processing pressure and processing residence time, maintained during the preparation process. A typical DAC-B product is described in more detail and may be made, e.g., in accordance with the procedures set out in U.S. Pat. Nos. 3,357,914, 3,437,629, 3,467,615 and 3,701,760 all of which are herein incorporated by reference.

DAC-C typically comprises a predominant amount of C-9–C-15 cyclic, bicyclic, tricyclic and polycyclic olefins and diolefins and toluene. Typically DAC-C has a specific gravity at about 15.6° C. of about 0.921 and a Gardner Color of about 1 (Gardner method ASTM D 1544). A typical analysis of the major components and properties of DAC-C is set out in Table II, but it is to be understood that the composition and properties of DAC-C may vary to some extent.

TABLE II

| | Percent (Volume) |
|---|---|
| TYPICAL MAJOR COMPONENTS | |
| Benzene | Trace |
| Toluene | 1.2–17.7 |
| Ethylene | 0.6–4.2 |
| C-9 Bicyclic Olefins | 0.6–1.1 |
| C-9 Bicyclic Diolefins | 1.5–3.1 |
| C-10 Cyclic Diolefins | 0.3–0.4 |
| C-10 Bicyclic Olefins | 6.0–8.8 |
| C-10 Bicyclic Diolefins | 6.5–7.8 |
| C-10 Tricyclic Olefins | 7.0–10.0 |
| C-10 Tricyclic Diolefins | 5.9–15.8 |
| C-11 Tricyclic Olefins | 1.5–2.1 |
| C-12 Tricyclic Diolefins | 0.7–2.2 |
| C-14 Polycyclic Diolefins | 0.4–0.7 |
| C-15 Polycyclic Olefins | 2.5–3.9 |
| C-15 Polycyclic Diolefins | 1.2–2.3 |
| TYPICAL PROPERTIES | |
| ASTM Distillation Range (100 ml. sample) (ASTM D 850) | |
| First Drop | 112°–126° C. |
| 10 ml. | 137°–148° C. |
| 50 ml. | 174°–216° C. |
| 96–99 ml. | 260°–358° C. |
| Residue | 1–4 ml. |
| Color, Varnish Scale | 1–5 |
| Specific Gravity, 15.6/15.6° C. | 0.92–0.95 |
| Water Content | 0.1–0.2% |

Typical of the second component C-5 olefins are 1-pentene, 2-methyl-1-butene, 2-methyl-2-butene, cyclopentene, cis-2-pentene and trans-2-pentene. The term "acyclic, conjugated C-5 dienes" as used herein is meant to consist essentially of isoprene, cis-piperylene and trans-piperylene. The debutanized aromatic concentrates, C-5 olefins and acylic, conjugated C-5 dienes of the second principal component may include cyclopentadiene, preferably in minor amounts. A typical second component mixture may consist essentially of an equal volume percent mixture of 2-methyl-2-butene, 1-pentene, cis-2-pentene, mixed 2-pentenes and cyclopentene. Another typical second component may consist of about 20 volume percent isoprene and about 80 volume percent piperylene.

As described in applicant's U.S. Pat. No. 4,056,498 the second principal component is typically present in an amount substantially less than the dicyclopentadiene component. For example, the second component may be present in an amount from about 5 percent to about 30 percent, and more preferably from about 5 percent to about 20 percent, of the total weight of the three principal components in the initial reaction.

It has now been surprisingly discovered that all unsaturated hydrocarbons (mono-olefins, diolefins, and polyenes)
1. which have more than five carbon atoms
2. which have no aromatic rings in their structure may be employed as the second principal component (Component "b") in reaction mixture to produce the resins of this invention.

Unsaturated hydrocarbons may be produced by the thermal or catalytic cracking of hydrocarbon materials. Feed materials to such cracking processes may be petroleum crudes of an aromatic, naphthenic, or paraffinic nature as well as mixed crudes. Additionally, feed materials may be gaseous, liquid or tar-like hydrocarbon materials. The products resulting from such cracking processes may be gaseous, liquid, or tar-like in nature or more usually mixtures of all three types of products.

A very large variety of such cracking processes are known such as U.O.P. dehydrogenation process, Houdry dehydrogenation process, Standard Oil of New Jersey process, Phillips Petroleum pebble heater process, T.P.C. process of the Socony Vacuum Oil Co., Koppers-Hasche-Wulff process, Kellogg steam pyrolysis process, Lurgi-Ruhrgas sandcracker process, Ruhrgas oil pyrolysis, and the Ugite process. Many of these are described in "MONO-OLEFINS, Chemistry and Technology" by F. Asinger, Pergamon Press (Translation up-date by B. J. Hazzard in 1968) herein incorporated by reference.

Products from such cracking processes include diolefins, and polyenes, that is compounds containing two or more carbon to carbon double bonds, both of an acyclic and cyclic structure.

The cracked products are further separated and isolated into more discrete fractions of a narrower carbon number and certain structural types by various processes well known in the art such as distillation, compression-absorption process, adsorption and desorption.

A second general source of unsaturated hydrocarbons useful as the second principal component of this invention is the Diels-Alder synthesis products resulting from the Diels-Alder reaction between 1,3 conjugated diolefins and any olefin, diolefin, polyene or acetylene.

Butadiene and its derivatives are capable of taking part in the Diels-Alder reaction almost without exception.

Just as simple butadiene derivatives are eminently suitable for the preparation of six-membered carbocyclic rings, so the addition reactions of cyclic dienes, such as cyclopentadiene, open the way to various bicyclic unsaturated compounds. An abundance of bicyclo[2.2.1]heptenes are thus easily available from cyclopentadiene.

The Diels-Alder synthesis reaction rates are improved by increased pressures which are especially effective with ethylene, propylene, and acetylene as dienophiles. The reaction rates are also improved by Lewis acids such as $AlCl_3$, $BF_3$ or $SnCL_4$.

A more thorough discussion of the Diels-Alder synthesis of unsaturated hydrocarbons is contained in "The Chemistry of ALKENES" by Saul Patai, Interscience Publishers, 1964, especially Chapter 11, Part V, The Diels-Alder Reaction, pages 878–953, herein incorporated by reference.

An excellent discussion of various classes of unsaturated hydrocarbon resins is contained in "The Chemistry of ALKENES", Volume 2, edited by Jacob Zabicky, Chapter 9, Polymers containing C=C bonds, (by Morton A. Golub), pages 411 to 509, herein incorporated by reference. None of Golub's hydrocarbon resin classes are modified, as in this invention, by any or all of the fatty acid-containing materials, rosin acid-containing materials, or ethylenically unsaturated lower aliphatic dicarboxylic acids or anhydrides (such as maleic anhydride).

In the succeeding discussion on the structure of component (b) of this invention, the following terms as herein defined are used:

Olefin-a hydrocarbon with one or more carbon to carbon double bonds.

Mono-Olefin-an olefin with only one carbon to carbon double bond.

Diolefin or Diene-an olefin with only 2 carbon to carbon double bonds.

Polyene-an olefin with 3 or more carbon to carbon double bonds.

Conjugated Diene and Polyene-the structure drawn below represents a conjugated diene:

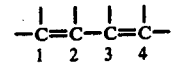

That is, in any four carbon chain the double bonds are between the 1 and 2 positions and the 3 and 4 positions, i.e. in positions one and three. If there are one or more carbon atoms between the double bonds, they are isolated or non-conjugated.

Polyenes may be conjugated either by having a four carbon conjugated system present and any number of additional isolated double bonds, or may be conjugated by forming an extended conjugated system. For example, if a third double bond were added to the above structure so that a six carbon atom chain is formed with the double bonds in the 1, 3 and 5 positions, an extended conjugated system is formed.

Cyclic-a hydrocarbon in which the carbon atoms are in a ring, or any number of rings, fused or non-fused, mono-cyclic, bicyclic, or polycyclic.

Acyclic Olefin-any olefin which is not a cyclic olefin.

Fused Rings-two or more rings in which one or more carbon atoms are common or shared.

Non-Fused or Isolated Rings-rings which do not share common carbon atoms.

Mono-Cyclic-the carbon atoms form in a single ring.

Bicyclic-two fused rings are present.

Polycyclic-three or more fused rings are present.

Cyclic Olefin-any olefin in which at least one carbon atom of a carbon to carbon double bond is present in a cyclic structure.

Simple Cyclic Olefin-a mono-cyclic olefin or any number of isolated mono-cyclic olefins is present.

Bicyclic Olefin-any olefin in which at least one carbon atom of a double bond is present in a bicyclic structure.

Polycyclic Olefin-any cyclic olefin in which at least one carbon atom of a double bond is present in a polycyclic structure.

In the following classification of olefins, four rules have been used to place compounds into one of 22 classes.

Rule 1-All olefin compounds in the following classification are either mono-olefins, diolefins, or polyenes. The number of carbon to carbon double bonds in the molecule determines which type it is.

Rule 2-All diolefin (or diene) and polyene compounds in the following classification are either conjugated or non-conjugated. If any conjugated system is present the compound will be in one of the conjugated groups, if not it will be in one of the non-conjugated groups.

Rule 3-All olefins in the following classification are either cyclic or acyclic. If one or more carbons of a double bond or bonds is a member of a ring the olefin will be in one of the cyclic groups, otherwise it will be in one of the acyclic groups.

Rule 4-All cyclic olefins in the following classification are either simple cyclic olefins; bicyclic olefins; or polycyclic olefins. In determining to which cyclic group a cyclic olefin belongs, complexity takes preference. That is, the olefin is classified according to the most complex ring system which contains at least one double bond. For example, a four double bond polyene with one double bond in a polycyclic structure, one in a bicyclic structure and two in a simple cyclic structure would be classified as a polycyclic polyene. The three other double bonds would be considered as unsaturated substituents for purposes of classification.

Application of these four rules and definitions is illustrated by classifying the four representative olefin structures below. For the sake of simplicity, only the carbon skeletons are depicted.

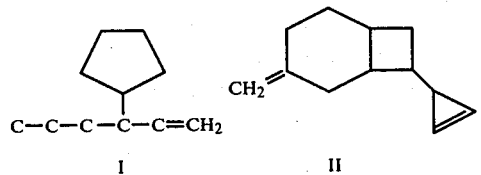

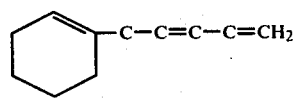

III

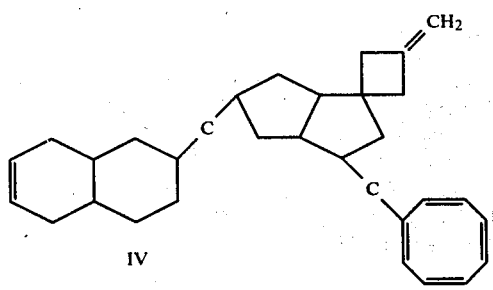

IV

Structure I contains only one double bond. According to Rule 1 it is a mono-olefin. Rule 2 does not apply. Since the double bond is not part of a ring, the compound is acyclic (the cyclopentyl group is a saturated substituent). Rule 4 does not apply. As is further discussed below, Structure I is actually an α-olefin, in addition to being an acyclic mono-olefin.

Structure II contains two isolated double bonds, so according to Rules 1 and 2 it is a non-conjugated diene. Both of the double bonds have at least one carbon which is a member of a ring. According to Rule 3 the compound is classified as cyclic. Since Rule 4 indicates that complexity takes preference, this compound is classified as bicyclic rather than simple cyclic. The compound is thus a bicyclic non-conjugated diene.

Structure III contains three double bonds. According to Rule 1 it is classified as a polyene. It also has a four carbon conjugated system. According to Rule 2 it is conjugated. One of the double bonds in Structure III is in a mono-cyclic ring. According to Rule 3 it is cyclic. According to Rule 4 it is simple cyclic. Structure III is classified as a simple cyclic conjugated polyene.

Structure IV contains six double bonds. According to Rule 1 it is a polyene. There is an extended conjugated system present. According to Rule 2 it is conjugated. All of the double bonds present have at least one carbon atom which is a member of a ring. According to Rule 3 the compound is cyclic. One double bond is part of a polycyclic ring system, one is part of a bicyclic ring system, and four conjugated double bonds are part of a mono-cyclic ring. Rule 4 indicates that complexity in rings takes preference. The compound is thus classified as a polycyclic conjugated polyene.

The non-aromatic, unsaturated hydrocarbon materials discussed above, which may be used as component (b) in the preparation of the novel synthetic resins of this invention, include:

MONO-OLEFINS

1. Acyclic Mono-Olefins (Alpha Olefins)
2. Acyclic Mono-Olefins (Non Alpha Olefins)
3. Simple Cyclic Mono-Olefins
4. Bicyclic Mono-Olefins
5. Bicyclic Mono-Olefins (Spiro Type)
6. Polycyclic Mono-Olefins: Four Types

DIOLEFINS

7. Acyclic Conjugated Dienes

8. Acyclic Non-Conjugated Dienes
9. Simple Cyclic Conjugated Diolefins
10. Bicyclic Conjugated Diolefins
11. Polycyclic Conjugated Diolefins
12. Simple Cyclic Non-Conjugated Diolefins
13. Bicyclic Non-Conjugated Diolefins
14. Polycyclic Non-Conjugated Diolefins

POLYENES

15. Acyclic Conjugated Polyenes
16. Acyclic Non-Conjugated Polyenes
17. Simple Cyclic Conjugated Polyenes
18. Bicyclic Conjugated Polyenes
19. Polycyclic Conjugated Polyenes
20. Simple Cyclic Non-Conjugated Polyenes
21. Bicyclic Non-Conjugated Polyenes
22. Polycyclic Non-Conjugated Polyenes

TERPENES

23. Acyclic Terpenes
24. Monocyclic Terpenes
25. Bicyclic Terpenes
26. Polycyclic Terpenes Acyclic mono-olefins in which the double bond is between a terminal carbon and the adjacent carbon (carbons 1 and 2) and in which the terminal carbon contains two hydrogen atoms are called alpha olefins. The following structure represents the alpha olefins of this invention:

(A)

in which
(1) $R_1$ and $R_2$ may be the same or different;
(2) $R_1$ and $R_2$ may be hydrogen, a straight chain alkyl, branched chain alkyl, or cyclic saturated hydrocarbon radical;
(3) the total number of carbon atoms in structure (A) must be greater than 5, is generally between 8 and 40, preferably between 12 and 24, and most preferably between 14 and 20.

Such compounds may be used as materials for component (b) in this invention. Illustrative examples of compounds having this structure are: 1-octene; 2-ethyl-1-hexene; 2-tert-butyl-3,3-dimethyl-1-butene; 1-decene; 4-cyclohexyl-1-butene; 1-dodecene; 1-tetradecene; 1-pentadecene; 1-hexadecene; 1-heptadecene; 1-octadecene; 1-nonadecene; 1-eicosene; 3-tert-butyl-1-hexadecene; 3,7,11,15-tetramethyl-1-hexadecene; 1-heneicosene; 19-methyl-1-eicosene; 1-docosene; 1-tetracosene; 1-hexacosene; 1-octacosene; 1-nonacosene; 1-triacontene; 2-ethyl-1-nonacosene; 1-dotriacontene.

Acyclic mono-olefins in which the double bond is not between a terminal carbon and the adjacent carbon are called non-alpha olefins. The following structure represents the non-alpha olefins of this invention:

(B)

in which (1) in the pairs $R_1$ and $R_2$ or $R_3$ and $R_4$X, both may not be hydrogen;
(2) $R_1$, $R_2$, $R_3$ and $R_4$ may be the same or different;
(3) $R_1$, $R_2$, $R_3$ and $R_4$ may be hydrogen, a straight chain alkyl, branched chain alkyl, or cyclic saturated hydrocarbon radical;
(4) the total number of carbon atoms is structure (B) must be greater than 5, is generally between 8 and 40, preferably between 12 and 24, and most preferably between 14 and 20.

Such compounds may be used as materials for component (b) in this invention. Illustrative examples of compounds having this structure are: 2-octene; 2,4,4-trimethyl-2-pentene; 2,3,4-trimethyl-3-hexene; 1-cyclohexyl-2-butene; 7-tetradecene; 7-pentadecene; 2-hexadecene; 4-hexadecene; 8-heptadecene; 2-octadecene; 3-octadecene; 7-octadecene; 7,8-diethyl-7-tetradecene; 9-nonadecene; 5-ethyl-7-methyl-6-hexadecene; 5-eicosene; 3,7,11,15-tetramethyl-2-hexadecene; 3-heneicosene; 9-pentacosene; 13-hexacosene; 14-octacosene; 2,25-dimethyl-13-heptacosene.

Simple cyclic mono-olefins of this invention may be represented by the following structures:

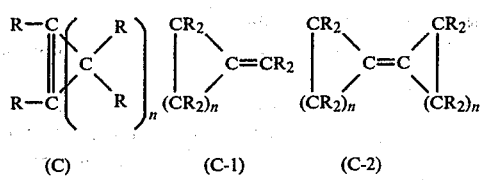

(C)    (C-1)    (C-2)

in which:
(1) at least one of the carbon atoms of the carbon to carbon double bond must be a member of a ring;
(2) the R's may be the same or different;
(3) R may be hydrogen, a straight chain alkyl, branched chain alkyl, or cyclic saturated hydrocarbon radical;
(4) n must be greater than zero;
(5) the total number of carbon atoms in each of the structures (C), (C-1) and (C-2) must be greater than 5, is generally between 8 and 40, preferably between 12 and 24, and most preferably between 14 and 20.

Such compounds may be used as materials for component (b) in this invention. Illustrative examples of compounds having this structure are: cyclohexene; methylcyclopentenes; methylcyclohexenes; methylcycloheptenes; cyclopentylcyclopentenes; cyclohexylcyclohexenes; cyclopentadecene; dibutylcycloheptenes; cyclohexadecene; 1,2,3-tributylcyclobutene; cyclooctadecene; 1-decylcyclooctene; dicyclohexylcyclohexenes; dicyclohexylcyclohexen-1-ylmethane; cyclodocosene; cyclotetracosene; cyclohexacosene; methylenecyclohexane; methylenecycloheptane; 1,1,4,4-tetramethyl-7-methylenecyclononane; cyclopentylidenecyclopentane; cyclohexylidenecyclohexane; dicyclohexylcyclohexylidenemethane.

Bicyclic mono-olefins of this invention may be represented by the following structure:

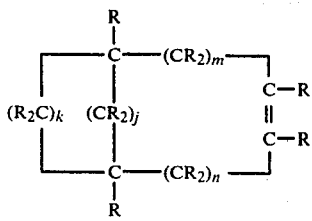

in which
(1) at least one of the carbon atoms of the carbon to carbon double bond must be a member of a ring;
(2) R's may be the same or different;
(3) R may be hydrogen, a straight chain alkyl, branched chain alkyl, or cyclic saturated hydrocarbon radical;
(4) the sum of j and k must be greater than zero;
(5) m and n each may be zero or any positive integer;
(6) the total number of carbon atoms in structure (D) must be greater than 5, is generally between 16 and 50, preferably between 18 and 40, and most preferably between 20 and 30.

Such compounds may be used as materials for component (b) in this invention. Illustrative examples of compound having this structure are: bicyclo[3.2.2]non-2-ene; bicyclo[12.1.0]pentadec-1-ene; 14-methylbicyclo[10.3.0]pentadec-1(12)-ene; 3-butyl-2-isopropyl-1,7,7-trimethylbicyclo[2.2.1]hept-2-ene; 5-decylbicyclo[2.2.1]hept-2-ene; 2,3-dibutyl-1,7,7-trimethylbicyclo[2.2.1]hept-2-ene; bicyclo[12.3.1]octadec-14-ene; bicyclo[10.8.0]eicosX-1(12)-ene; 5-tetradecylbicyclo[2.2.1]hept-2-ene; bicyclo[12.8.0]docos-1(14)-ene; bicyclo[26.10.0]octatriacont-1(28)-ene; 2-methylenebicyclo-[3.2.0]heptane; 5-ethylidene-6-methylbicyclo[2.1.1]hexane; 1,2,2-trimethyl-3-methylenebicyclo[2.2.1]heptane.

Bicyclic mono-olefins (Spiro Type) of this invention may be represented by the following structure:

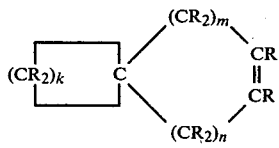

in which
(1) at least one of the carbon atoms of the carbon to carbon double bond must be a member of a ring;
(2) R's may be the same or different;
(3) R may be hydrogen, a straight chain alkyl, branched chain alkyl, or cyclic saturated hydrocarbon radical;
(4) k must be greater than one;
(5) m and n each may be zero or any positive integer;
(6) the total number of carbon atoms in structure (E) must be greater than 5, is generally between 16 and 50, preferably between 18 and 40, and most preferably between 20 and 30.

Such compounds may be used as materials for component (b) in this invention. Illustrative examples of compounds having this structure are: spiro[2.5]oct-5-ene; spiro[3.4]oct-5-ene; 5-methylspiro[2.4]hept-4-ene; spiro[4.4]non-1-ene; spiro[4.5]dec-6-ene; spiro[5.5]undec-1-ene; spiro[5.5]undec-2-ene; spiro[4.11]hexadec-6-ene; spiro[10.11]docos-12-ene; 1-methylenespiro[2.4]heptane; 1-methylenespiro[4.4]nonane.

Polycyclic mono-olefins (four types): For sake of clarity only the carbon skeletons are shown in the following systems. The rings may be of any size, provided they contain at least three carbon atoms. All unsatisfied carbon bonds must contain the appropriate number of either hydrogen, straight chain alkyl, branched chain alkyl, or cyclic saturated hydrocarbon radicals to satisfy the valence. The carbon to carbon double bond may be anywhere in the ring system, provided that at least one of the carbon atoms of the carbon to carbon double bond is a member of a ring.

(F) and (G) are illustrative of the Type I structures of this invention.

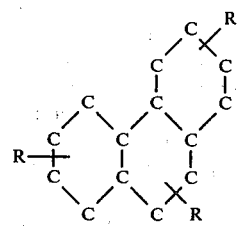

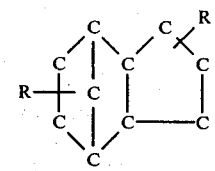

Additional possibilities exist meeting the following requirements:
(1) this Type I is characterized by three or more rings being fused together in a chain-like manner so that two (or more) distinct bicyclic centers, each having two common carbon atoms, are present;
(2) R's may be the same or different;
(3) R may be hydrogen, a straight chain alkyl, branched chain alkyl, or cyclic saturated hydrocarbon radical;
(4) the total number of carbon atoms in each of structures (F) and (G) must be greater than 6, is generally between 16 and 50, preferably between 18 and 40, and most preferably between 20 and 30.

Such compounds may be used as materials for component (b) in this invention. Illustrative examples of compounds having this structure are: 1,2,3,4,4a,5,6,7,8,9,9a,10-dodecahydroanthracene; 1,2,3,4,4a,5,6,7,8,8a-decahydro-5,5,8a-trimethylcyclobuta[a]naphthalene; 9,9-dimethyl-1,2,3,4,4a,5,6,7,8,9,10,10a-dodecahydrophenanthrene; 1,2,3,4,4a,4b,5,6,7,8,8a,9,10,12a,12b-hexadecahydrotriphenylene; 1,2,3,4,4a,4b,5,6,7,8,8a,8b,9,12,12a,12b-hexadecahydrotriphenylene; 6,6-dimethyl-1,2,3,4,5,5a,6,7,7a,8,9,10,11,12-tetradecahydrobenzo[1,2:3,4]dicycloheptene; 7-ethyl-1,2,3,4,4a,4b,5,6,7,8,8a,9-dodecahydro-1,1,4b,7-tetramethylphenanthrene; 1,4:5,8-dimethanododecahydroanthracenes; 2,3,4,4a,5,6,7,8,9,10,11,11b-dodecahydro-7,10-methano-4,4,11b,12-tetramethyl-1H-cyclohepta[a]naphthalene.

(H) and (I) are illustrative of the Type II structures of this invention.

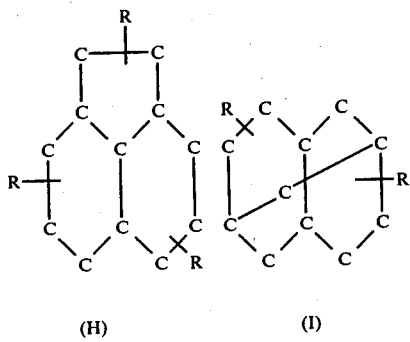

(H)       (I)

Additional possibilities exist which, like (H) and (I), meet the following requirements:
(1) this Type II is characterized by three or more rings being fused together, such that one or more carbon atoms in one or more fused cyclic centers are common to the fused ring system;
(2) R's may be the same or different;
(3) R may be hydrogen, a straight chain alkyl, branched chain alkyl, or cyclic saturated hydrocarbon radical;
(4) the total number of carbon atoms in each of structures (H) and (I) must be greater than 5, is generally between 16 and 50, preferably between 18 and 40, and most preferably between 20 and 30.

Such compounds may be used as materials for component (b) in this invention. Illustrative examples of compounds having this structure are: octahydroacenaphthenes; decahydrophenalenes; 3,7-dimethyl-3a,3b,4,5,6,7-hexahydro-4-isopropyl-1H-cyclopenta-[1,3]cyclopropa[1,2]benzene; 1,2,4-tri-butyltricyclo[3.1.0.0$^{3,6}$]-hex-3-ene; 1,2,3,4,4a,5,6,7,8,9,10,11,12,-12a-tetradecahydro-2,9-ethanodibenzo[a,e]cyclooctene; tricyclo[3.3.1.1$^{3,7}$]decylidenetricyclo [3.3.1.1$^{3,7}$]decane.

(J) is illustrative of the Type III structures of this invention.

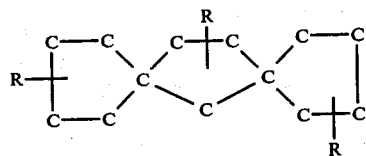

(J)

Additional possibilities exist, which like (J) meet the following requirements:
(1) this Type III is characterized by a sequence of three or more rings in which adjacent rings share single carbon atoms to form di or poly spiro ring systems;
(2) R's may be the same or different;
(3) R may be hydrogen, a straight chain alkyl, branched chain alkyl, or cyclic saturated hydrocarbon radical;
(4) the total number of carbon atoms in structure (J) must be greater than 6, is generally between 16 and 50, preferably between 18 and 40, and most preferably between 20 and 30.

Such compounds may be used as materials for component (b) in this invention. Illustrative examples of compounds having this structure are: 7-cyclopropylidenedispiro[2.0.2.1]heptane; 7-methylenedispiro[2.1.4.1]decane; 10-methylenetrispiro[2.0.2.0.2.1]-decene; 3,11-dimethyldispiro[5.1.5.2]pentadec-14-ene.

(K) is illustrative of the Type IV structures of this invention.

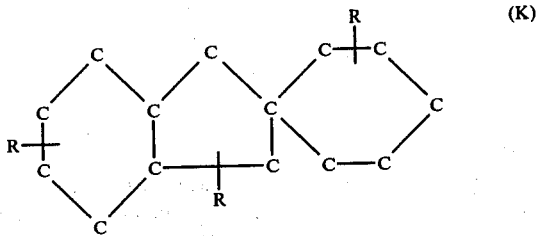

(K)

Additional possibilities exist, which meet the following requirements:
(1) this Type IV is characterized by three or more fused rings which are fused by varying combinations of two or more of the ring fusions in Types I, II, and III;
(2) R's may be the same or different;
(3) R may be hydrogen, a straight chain alkyl, branched chain alkyl, or cyclic saturated hydrocarbon radical;
(4) the total number of carbon atoms in structure (K) must be greater than 5, is generally between 16 and 50, preferably between 18 and 40, and most preferably between 20 and 30.

Such compounds may be used as materials for component (b) in this invention. Illustrative examples of compounds having this structure are: spiro[cyclopropane-1,8'-tricyclo[3.2.1.0$^{2,4}$]oct[6]ene]; 2a,2b,2c,4,5,6,7-,7a,7b,7c-decahydro-2,7c-diethyl-3H-cyclohepta[a]cyclopropa[c,d]pentalene; 4-tert-butyl-5',5'-dimethylspiro[cyclohexane-1,7',bicyclo[2.2.1]hept[2]ene].

Acyclic conjugated dienes of this invention may be represented by the structure:

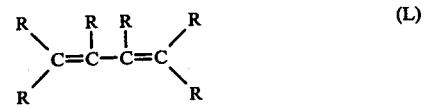

(L)

in which
(1) R's may be the same or different;
(2) R may be hydrogen, a straight chain alkyl, branched chain alkyl, or cyclic saturated hydrocarbon radical;
(3) the total number of carbon atoms in structure (L) must be greater than 5, is generally between 8 and 40, preferably between 12 and 24, and most preferably between 14 and 20.

Such compounds may be used as materials for component (b) in this invention. Illustrative examples of compounds having this structure are: 1,3-hexadiene; 2,4-heptadiene; 2,4-dimethyl-2,4-hexadiene; 2,5-dimethyl-2,4-hexadiene; 2-methyl-2,4-octadiene; 7-methyl-2,4-octadiene; 1,3-hexadecadiene; 7,9-hexadecadiene; 1,4-dicyclohexyl-1,3-butadiene; 8-methylene-6-octadecene; 3,7,11,15-tetramethyl-1,3-hexadecadiene; 7,11,15-trimethyl-3-methylene-1-hexadecene.

Acyclic non-conjugated dienes of this invention may be represented by the structure:

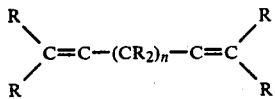

(M)

in which
(1) R's may be the same or different;
(2) R may be hydrogen, a straight chain alkyl, branched chain alkyl, or cyclic saturated hydrocarbon radical;
(3) n must be greater than zero;
(4) the total number of carbon atoms in structure (M) must be greater than 5, is generally between 8 and 40, preferably between 12 and 24, and most preferably between 14 and 20.

Such compounds may be used as materials for component (b) in this invention. Illustrative examples of compounds having this structure are: 1,5-hexadiene; 2-isopropyl-1,4-hexadiene; 2-isopropyl-1,5-hexadiene; 1,9-decadiene; 2,6-dimethyl-2,6-octadiene; 1,13-tetradecadiene; 4,4,7,7-tetramethyl-1,9-decadiene; 2,6,10-trimethyl-2,6-dodecadiene; 2,6,10-trimethyl-2,8-dodecadiene; 1,9-octadecadiene; 6,9-octadecadiene; 1,17-octadecadiene; 1,19-eicosadiene; 1,20-heneicosadiene; 1,22-hentriacontadiene.

Simple cyclic conjugated diolefins of this invention may be represented by the following structures:

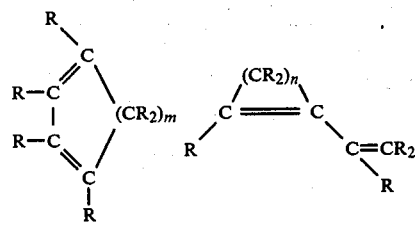

(N)            (O)

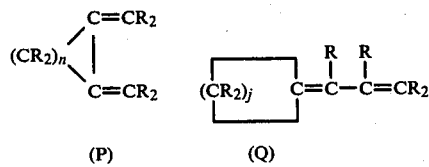

(P)            (Q)

in which
(1) R's may be the same or different;
(2) R may be hydrogen, a straight chain alkyl, branched chain alkyl, or cyclic saturated hydrocarbon radical;
(3) n must be greater than zero;
(4) j must be greater than one;
(5) m may be zero, or any positive interger;
(6) the total number of carbon atoms in each of structures (N), (O), (P) or (Q) must be greater than 5, is generally between 16 and 50, preferably between 18 and 40, and most preferably between 20 and 30.

Such compounds may be used as materials for component (b) in this invention. Illustrative examples of compounds having this structure are: 1,3-cyclohexadiene; methylcyclopentadienes; 1,2,4-trimethyl-1,3-cyclohexadiene; 2,6,6-trimethyl-1,3-cyclohexadiene; 1,3,5,5-tetramethyl-1,3-cyclohexadiene; 1,5,5,6-tetramethyl-1,3-cyclohexadiene; 1,3-cyclododecadiene; 1,3-cyclotetradecadiene; 1,2,3-tris-tert-butyl-1,3-cyclobutadiene; 1,5-dimethyl-3-methylenecyclohexene; 5,5-dimethyl-3-methylenecyclohexene; 6,6-dimethyl-1-vinylcyclohexene; 1,2-dimethylenecyclohexane; 1-allylidene-2,2-dimethylcyclopropane.

Bicyclic conjugated diolefins of this invention may be represented by the following structures (R), (S), (T), or (U):

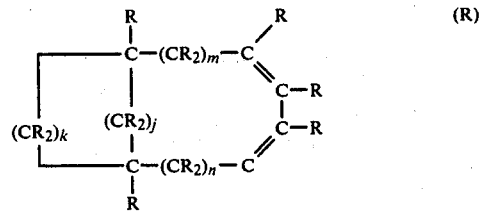

(R)

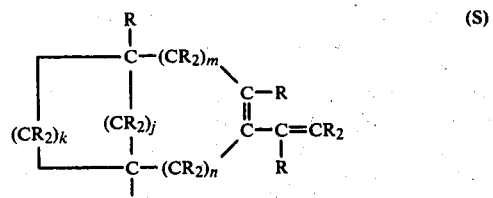

(S)

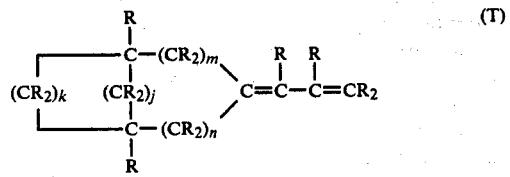

(T)

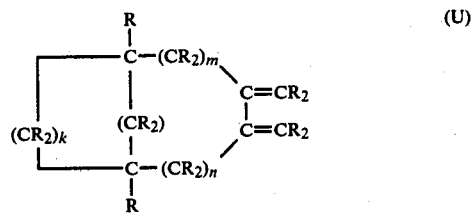

(U)

in each of which
(1) the double bonds may also be situated such that one carbon to carbon double bond is in each of the rings, provided that a four carbon conjugated system is present;
(2) R's may be same or different;
(3) may be hydrogen, a straight chain alkyl, branched chain alkyl, or cyclic saturated hydrocarbon radical;
(4) the sum of k and j must be greater than zero;
(5) m and n may be zero, or any positive integer;
(6) the total number of carbon atoms in each of structures (R), (S), (T), or (U) must be greater than 6, is generally between 16 and 50, preferably between 18 and 40, and most preferably between 20 and 30.

Other types of ring fusions may exist. For instance, those shown in the paragraph-Bicyclic mono-olefins (Spiro Type), i.e., Structure (E), are included with the addition of a second carbon to carbon double bond to form a conjugated four carbon system.

Such compounds may be used as materials for component (b) in this invention. Illustrative examples of compounds having this structure are: 2,3,3a,7a-tetrahydroindene; bicyclo[4.2.1]nona-2,4-diene; spiro[4.4]nona-1,3-diene; 7-isopropylbicyclo[4.1.0]hepta-2,4-diene; 5-methyl-1,2,3,4,4a,8a-hexahydronaphthalene; 7,7,8,8-tetramethylbicyclo[4.2.0]octa-2,4-diene; 3a,6-dimethyl-1,2,3,3a,4,8a-hexahydro-1-isopropylazulene; 4,5,6,7-tetrahydroindene; 6,6-dimethyl-2-vinylbicyclo[3.1.1]hept-2-ene; 3a,7a-dimethyl-1-(1,5-dimethylhexyl)-3a,6,7,7a-tetrahydro-4-vinylindan; 2-allylidenebicyclo[2.2.1]heptane; 2,3-dimethylenebicyclo[2.2.1]heptane.

Polycyclic conjugated diolefins of this invention may be represented by the same type structures as appear in the paragraph-Polycyclic mono-olefins, i.e., Structures (F) to (K), with the addition of a second carbon to carbon double bond to form a conjugated system. One carbon atom of the entire four carbon atom conjugated system must be part of a ring, as was illustrated in the immediately preceding paragraphs (See (R), (S), (T), (U) discussion). Also, the conjugated four carbon system may be situated so that each double bond is located in a different ring. The total number of carbon atoms in modified structures (F) to (K) must be greater than 9, is generally between 16 and 50, preferably between 18 and 40, and most preferably between 20 and 30.

Such compounds may be used as materials for component (b) in this invention. Illustrative examples of compounds having this structure are: 1,4a-dimethyl-1,2,3,4,4a,4b,5,6,10,10a-decahydrophenanthrene; 1,2,3,4,5,6,9,10,11,12,13,14,14a,14b-tetradecahydrocyclobuta[1,2:3,4]dicyclononene; 1,2,3,4,4a,4b,5,6,10,10a-decahydro-7-isopropyl-1,1,4a-trimethylphenanthrene; 1,2,3,4,4a,4b,5,8,8a,9,10,10a-dodecahydro-8-methylene-1,1,4a,7,8a-pentamethylphenanthrene; 1,2,3,4,5,6,7,8,9,10-decahydro-1,1,5,5,6,6,10,10-octamethylcyclobuta[1,2,:3,4]dicycloheptene; tricyclo[4.3.1.0$^{8,16}$]deca-2,4-diene; tricyclo[4.3.1.0$^{7,9}$]deca-2-4-diene.

Simple cyclic non-conjugated diolefins of invention may be represented by the following structures:

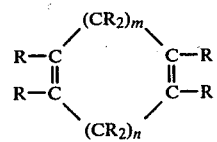

(V)

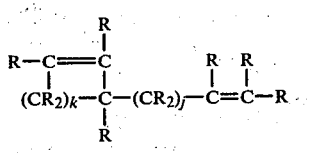

(W)

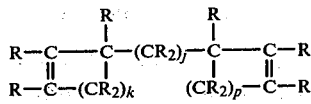

(X)

in which
(1) the R's may be the same or different;
(2) R may be hydrogen, a straight chain alkyl, branched chain alkyl, or cyclic saturated hydrocarbon radical;
(3) m and n must each be greater than zero;
(4) k, j or p may each be zero or any positive integer.
(5) in structures (W) and (X), the double bond may be anywhere in the ring(s), provided conjugation is not established;
(6) the total number of carbon atoms in each of structures (V), (W), or (X) must be greater than 5, is generally between 16 and 50, preferably between 18 and 40, most preferably between 20 and 30.

Such compounds may be used as materials for component (b) in this invention. Illustrative examples of compounds having this structure are: 1,5-cyclooctadiene; 1,2,4-trimethyl-1,4-cyclohexadiene; 1,3,5-trimethyl-1,4-cyclohexadiene; 2,6,6-trimethyl-1,4-cycloheptadiene; 1,9-cyclohexadecadiene; 1,10-cyclooctadecadiene; 1,12-cyclodocosadiene; 1,13-cyclotetracosadiene; 1,4-dimethyl-4-vinylcyclohexene; 1,10-bis(3-cyclohexen-1-yl)decane.

Bicyclic non-conjugated diolefins of this invention may be represented by the structure below:

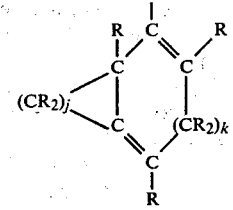

(Y)

in which
(1) R's may be the same or different;
(2) R may be hydrogen, a straight chain alkyl, branched chain alkyl, or cyclic saturated hydrocarbon radical;
(3) j and k must each be greater than zero;
(4) the total number of carbon atoms in structure (Y) must be greater than 6, is generally between 16 and 50, preferably between 18 and 40, and most preferably between 20 and 30.

Other types of ring fusions may exist. For instance, those shown in the paragraph-Bicyclic mono-olefins (Spiro Type), i.e., Structure E, are included with the addition of a second carbon to carbon bond to form a non-conjugated system.

Any of the following structural alternatives in the placement of the two double bonds may exist:
(a) both isolated carbon to carbon double bonds may be in the same ring or in different rings;
(b) one isolated carbon to carbon bond may be exocyclic using one carbon atom of either ring, the other isolated carbon to carbon bond may be in the same or in a different ring;
(c) both isolated carbon to carbon bonds may be exocyclic using two nonadjacent carbon atoms in the same ring or in different rings; and
(d) one double bond may be in a ring and the other as a substituent on the same or another ring.

Such compounds may be used as materials for component (b) in this invention. Illustrative examples of compounds having this structure are: bicyclo[3.3.1-]nona-2,6-diene; bicyclo[3.2.2]nona-2,6-diene; 4-ethylbicyclo[3.2.1]octa-2,6-diene; 1,4,4a,5,6,9,10,10a-octahydrobenzocyclooctene; bicyclo[8.2.2]tetradeca-11,13-diene; 4,11,11-trimethyl-8-methylenebicyclo[7.2.0]undec-4-ene; 2,4a,5,6,7,9a-hexahydro-3,5,5,9-tetramethyl-1H-benzocycloheptene; 1,2,3,3a,4,7,8,11,12,12a-decahydro-1-isopropyl-3a,6,10-trimethylcyclopentacycloundecene; 1,6-dimethyl-2-isopropyl-1,2,3,5,6,7,8,8a-octahydro-1-propyl-6-vinylnaphthalene.

Polycyclic non-conjugated diolefins of this invention may be represented by the same type structures as appear in the paragraph Polycyclic mono-olefins (four types): i.e., Structures (F)–(K), with the addition of a second carbon to carbon double bond, isolated from the first double bond, so that no conjugation is formed.
(1) R's may be the same or different;
(2) R may be hydrogen, a straight chain alkyl, branched chain alkyl, or cyclic saturated hydrocarbon radical;
(3) the total number of carbon atoms in each of modified structures (F), (G), (H), (I), (J), or (K) must be greater than 9, is generally between 16 and 50, preferably between 18 and 40, and must preferably between 20 and 30.

Any of the following structural alternatives in the placement of the two double bonds may exist;
(a) both isolated carbon to carbon double bonds may be in the same ring or in different rings;
(b) one isolated carbon to carbon bond may be exocyclic using one carbon atom of either ring, the other isolated carbon to carbon bond may be in the same or in a different ring;
(c) both isolated carbon to carbon bonds may be exocyclic using two nonadjacent carbon atoms in the same ring or in different rings; and
(d) one double bond may be in a ring and the other as a substituent on the same or another ring.

Such compounds may be used as materials for component (b) in this invention. Illustrative examples of compounds having these structures are: 1,2,3,4,5,6,7,8,9,10-decahydroanthracene; 1,2,4,4a,5,6,8,8a-octahydro-4,4,8,8-tetramethyl-S-indacene; 1,2,3,4,6a,6b,9,10,11,12,12a,12b-dodecahydrocyclobuta[1,2:3,4]dicyclooctene; 1,2,3,4,4a,6,7,8,8a,9-decahydro-1,1,4a,8a-tetramethylphenanthrene; 1,2,3,4,4b,5,8,8a,9,10-decahydro-7-isopropyl-1,1,4b-trimethylphenanthrene; 1,3,4,8-tetra-tertbutyltricyclo[4.2.0.0$^{2,5}$]octa-3,7-diene; tricyclo[4.2.2.0$^{2,5}$]deca-7,9-diene; 9,10-diisopropylidenetricyclo[4.2.1.1$^{2,5}$]decane; 1,4,4a,5,8,8a,9,9a,10,10a-decahydro-5-methyl-1,4:9,10-dimethanoanthracene; 1,2,3,4,4,a,5,6,9,10,13,14,14a-dodecahydro-1,4-methanobenzocyclododecene; 15,16-dimethyltricyclo[9.3.1.1$^{4,8}$]hexadeca-1(15),8(16)-diene; 1,2,3,4,5,6,7,8,9,10,11,12-dodecahydro-2,9-ethanodibenzo[a,e]cyclooctene; dispiro[2.2.2.2]deca-4,9-diene; 7,14-dimethylenedispiro[5.1.5.1]tetradecane; 7-tertbutyldispiro[2.2.4.2]deca-4,11-diene; 3,3''-dimethyldispiro[bicyclo[2.2.1]hept-5-ene-2,1'-cyclobutane-3',2''-bicyclo[2.2.1]hept[5]ene].

Acyclic conjugated polyenes of this invention may be represented by the following structure:

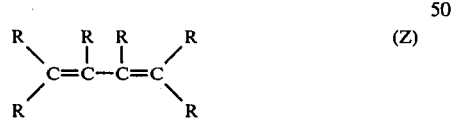

in which
(1) R's may be the same or different;
(2) at least one of the R groups must contain one or more acyclic carbon to carbon double bonds which may or may not be conjugated with the rest of the system;
(3) R may be hydrogen, a straight chain alkyl, branched chain alkyl, or cyclic saturated hydrocarbon radical;
(4) the total number of carbon atoms in structure (Z) must be greater than 5, is generally between 8 and 40, preferably between 12 and 24, and most preferably between 14 and 20.

Such compounds may be used as materials for component (b) in this invention. Illustrative examples of compounds having this structure are: 1,3,5-hexatriene; 1,3,5,7-octatetraene; 3-ethyl-1,3,5-hexatriene; 2,4-dimethyl-1,3,5-hexatriene; 2,5-dimethyl-1,3,5-hexatriene; 3,7-dimethyl-1,3,7-octatriene; 3,7,11-trimethyl-1,3,6,10-dodecatetraene; 9-isopropyl-6,10,10-trimethyl-2,4,6,8-undecatetraene.

Acyclic non-conjugated polyenes of this invention may be represented by the following structure:

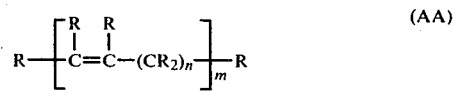

in which
(1) R's may be the same or different;
(2) R may be hydrogen, a straight chain alkyl, branched chain alkyl, or cyclic saturated hydrocarbon radical;
(3) the R groups may also contain acyclic unsaturation provided that this does not establish any four carbon atom conjugated systems in the structure;
(4) n must be greater than zero;
(5) m must be greater than two;
(6) the total number of carbon atoms in structure (AA) must be greater than 6, is generally between 8 and 40, preferably between 12 and 24, and most preferably between 14 and 20.

Such compounds may be used as materials for component (b) in this invention. Illustrative examples of compounds having this structure are: 5-ethyl-1,4,8-nonatriene; 2,6-dimethyl-1,5,8-undecatriene; 2,8-dimethyl-1,4,9-undecatriene; 1,6,10,14-hexadecatetraene; 2,6,10-trimethyl-2,6,10-tetradecatriene; 1,6,11,17-octadecatetraene; 1,8,11-octadecatriene; 3,6,9,12,15-nonadecapentaene; 4,7,10,13-nonadecatetraene; 4,7-di-(isobuten-1-yl)-2,9-dimethyldeca-2,8-diene; 1,5,9,13,17-heneicosapentaene; 1,6,9,12,15-heneicosapentaene.

Simple cyclic conjugated polyenes of this invention may be represented by structures similar to (N) to (Q) shown in the paragraph on simple cyclic conjugated diolefins, with the addition of one or more carbon to carbon double bonds.

In which:
(1) R's may be the same or different;
(2) at least one of the R groups must contain one or more carbon to carbon double bond units which may or may not be conjugated with the rest of the system;
(3) R may be hydrogen, a straight chain alkyl, branched chain alkyl, or cyclic saturated hydrocarbon radical;
(4) the total number of carbon atoms in each of modified structures (N) to (Q) must be greater than 6, is generally between 10 and 50, preferably between 12 and 30, and most preferably between 14 and 24.

Such compounds may be used as materials for component (b) in this invention. Illustrative examples of compounds having such a structure are: 1,3,5-cyclooctatriene-2,3,7,7-tetramethyl-1,3,5-cycloheptatriene; 1,3,10,12-cyclooctadecatetraene; 1,3,11,13-cycloeicosatetraene; 14-isopropyl-3,7,11-trimethyl-1,3,6,10-cyclotetradecatetraene; 4-isopropyl-1,7,11-trimethyl-1,3,7,11-cyclotetradecatetraene; 5-methylene-1,2,3,4-tetramethyl-1,3-cyclopentadiene; 2-(2,2-dimethylpropyl)-6-methylene-1,3,4,5,5-pentamethyl-1,3- cyclohexadiene; 1,2,3,3,4,5-hexaethyl-6-ethylidene-1,4-cyclohexadiene; 1,5-dimethyl-4-isopropenyl-1,3-cyclopentadiene; 1,1,2-trimethyl-5-vinyl-2,4-cyclopentadiene; 4-isopropenyl-1,2-dimethyl-1,4-cyclohexadiene; 1,3,3-trimethyl-2-(1,3-butadienyl)-cyclohexene; 3-methyl-1-(2,6,6-trimethyl-1-cyclohexen-1-yl)-1,3,5-hexatriene; 1-[3-(heptenyl)-3-cycohexen-1-yl]-1,3-nonadiene; bi-1,3,5-cyclohepatrien-1-yl; 1,8-bis(1,3-cyclopentadiene-1-yl)octane.

Bicyclic conjugated polyenes of this invention may be represented by structures similar to (R) to (U) described in the paragraph on bicyclic conjugated diolefins.

The same points (1) thru (5), discussed in this earlier paragraph on bicyclic conjugated diolefins, apply to the bicyclic conjugated polyene structures. However, at least one more double bonds must be added to structures (R) to (U) to obtain the polyenes of this paragraph.

The additional double bonds may or may not be in conjugation with the rest of the system.

(6) the total number of carbon atoms in each of modified structures (R), (S), (T), or (U) must be greater than 6, is generally between 10 and 50, preferably between 12 and 30, and most preferably between 14 and 24.

Such compounds may be used as materials for component (b) in this invention. Illustrative examples of compounds having such a structure are: 2-methylbicyclo[3.2.0]hepta-1,4,6-triene; bicyclo[4.2.0]octa-2,4,7-triene; bicyclo[4.2.2]deca-2,4,7,9-tetraene; 4,5,6,7-tetrahydro-1H-benzocycloheptene; 2,3,4,7-tetrahydro-1H-benzocycloheptene; 3,5,5-trimethyl-4a,5,8,8a-tetrahydronaphthalene; 2,4-di-tert-butylbicyclo[4.2.0]octa-2,4,7-triene; 6-(1,3-cyclopentadiene-1-yl)bicyclo[5.4.1]dodeca-2,4,7,9,11-pentaene; 1,2,6,7,8,8a-hexahydro-8a-methyl-3-vinylnaphthalene; 3,4,4a,5,8,8a-hexahydro-8a-methyl-1-vinylnaphthalene; 4,8-dimethyl-2-isopropylidene-1,2,3,3a,4,8a-hexahydroazulene; 9,10-dialylidenebicyclo[6.2.0]deca-1(8),2,6-triene; 1,1-dimethyl-2-(4-methyl-1,3-pentadienyl)-4,5,6,7-tetrahydro-1H-indene; 1-(2-methylenecyclohexylidene)-2-(bicyclo[4.4.0]decyclidene)ethane; 2,3,4,6,7,8-hexahydro-1,1,4,4,8,8-hexamethyl-5-isopropenyl-1H-benzocycloheptene.

Polycyclic conjugated polyenes of this invention may be represented by structures similar to (F) to (K) described in the paragraph on polycyclic mono-olefins (four types). In the hydrocarbons of this paragraph, however, the requirements of the preceding paragraph on bicyclic conjugated polyenes must also be met by these structures, namely there must be three or more double bonds present, at least two of which must be in conjugation.

The total number of carbon atoms in modified structures (F) to (K) must be greater than 9, is generally between 10 and 50, preferably between 12 and 30, and most preferably between 14 and 24.

Such compounds may be used as materials for component (b) in this invention. Illustrative examples of compounds having such a structure are: 1,4a-dimethyl-7-isopropyl-1,2,3,4,4a,4b,5,10a-octahydrophenanthrene; 1,2,3,4,4a,4b,5,6,10,10a-decahydro-7-isopropyl-1-methylene-4a-methylphenanthrene; tricyclo[8.4.2.0$^{2,9}$]hexadeca-3,5,7,11,13,16-hexaene; 1,2,3,5,5a,6,7,8,10,10a-decahydropyrene; Spiro[cyclohexene-1,10'(2'H)-[5,9]methanobenzocyclooctene].

Simple cyclic non-conjugated polyenes of this invention may be represented by structures similar to (V) to (X) in the paragraph on simple cyclic non-conjugated diolefins. However, one or more double bonds must be added so that there are three or more non-conjugated double bonds present in the structures.

(1) the double bonds may also be situated such that one carbon to carbon double bond is in each of several isolated monocyclic rings, provided that a four carbon conjugated system is not present;
(2) R's may be the same or different;
(3) R may be hydrogen, a straight chain alkyl, branched chain alkyl, or cyclic saturated hydrocarbon radical;
(4) the sum of k and j must be greater than zero;
(5) m and n may each be zero, or any positive integer;
(6) the total number of carbon atoms in each of the modified structures of this paragraph must be greater than 8, is generally between 10 and 50, preferably between 12 and 30, and most preferably between 14 and 24.

Such compounds may be used as materials for component (b) in this invention. Illustrative examples of compounds having such a structure are: 1,5,9-cyclododecatriene; 1,5,9,13-cyclohexadecatetraene; 1,5,9,13,17-cycloeicosapentaene; 1,9,17-cyclotetracosatriene; 1,9,17,25-cyclodotriacontatetraene; 1,3,3-trimethyl-6-vinyl-1,4-cyclohexadiene; 1-methyl-3-(1,1,2-trimethyl-2-propenyl)-1,4-cyclhexadiene; 12-vinyl-1,5,9-cyclotetradecatriene; 3-(2-butenyl)-1,5,9-cyclododecatriene; 16-vinyl-1,5,9,13-cyclooctadecatetraene; 1,4,7,10-tetrakis(methylene)cyclododecane; cyclohexenyldicyclohexenyls; 6-methyl-2-[3-(4-methyl-3-pentenyl)-3-cyclohexen-1-yl]-1,5-heptadiene.

Bicyclic non-conjugated polyenes of this invention may be represented by structure (Y) described in the paragraph on bicyclic non-conjugated diolefins, with the addition of one or more carbon to carbon double bonds to form a non-conjugated system. There must be at least three carbon to carbon double bonds in the system, none of which are conjugated.

The same variability in the location of the three or more carbon to carbon double bonds in this system, as covered in alternatives (a) through (d) of the paragraph on bicyclic non-conjugated diolefins applies to the structures of this paragraph. That is, the three or more isolated carbon to carbon double bonds may be in one or more rings, or may be exocyclic in several different ways.

The total number of carbon atoms in each of the modified structures of this paragraph must be greater than 7, is generally between 10 and 50, preferably between 12 and 30, and most preferably between 14 and 24.

Such compounds may be used as materials for component (b) in this invention. Illustrative examples of compounds having this structure are: bicyclo[2.2.2]octa-2,5,7-triene; spiro[4.5]deca-2,6,9-triene; 3,7,11,15,15-pentamethylbicyclo[12.1.0]-pentadeca-2,6,10-triene.

Polycyclic non-conjugated polyenes of this invention may be represented by the structures (F) to (K) in the paragraph on the polycyclic mono-olefins (four types) except that these ring systems will contain three or more isolated carbon to carbon double bonds.

Further, the same variability in the location of the three or more isolated carbon to carbon double bonds applies in this system, as is described in alternatives (a), (b), (c), and (d) of the paragraph on bicyclic non-conjugated diolefins. That is, the three or more isolated carbon to carbon double bonds may in one or more rings, or may be exocyclic in several different ways.

The total number of carbon atoms in each of the modified structures of this paragraph must be greater than 9, is generally between 10 and 50, preferably between 12 and 30, and most preferably between 14 and 24.

Such compounds may be used as materials for component (b) in this invention. Illustrative examples of compounds having this structure are: 3,4,4a,4b,7,8,8a,10a-octahydrophenanthrene; tricyclo[20.8.0.0$^{7,16}$]-triaconta-1(22),7(16),9,13,24,28-hexaene; 1,4,4a,5,6,9,10,13,14,14a-decahydro-1,4-methanobenzocyclododecene; tricyclo[3.3.2.0$^{2,8}$]deca-3,6,9-triene; dispiro[bicyclo[2.2.1]hepta-2,5-diene-7,1'-cyclopropane-2',7''-bicyclo-[2.2.1]hepta[2,5]diene].

Terpenes are derivatives of isoprene, having the empirical formula $(C_5H_8)_x$ where X=2 (Mono-Terpenes)
X=3 (Sesqui-Terpenes)
X=4 (Di-Terpenes)
X=6 (Tri-Terpenes)

All unsaturated terpenes may be used as materials for component (b) in this invention.

For the sake of clarity only the carbon skeletons are shown in the following systems. All unsatisfied carbon bonds must contain the appropriate number of hydrogens to satisfy their valence.

Although all unsaturated terpene structures are described in one or more of the previous twenty-two paragraphs, they are particularly described in the next four paragraphs on the basis of the following structural classifications.

Acyclic unsaturated terpenes of this invention may be represented by the following structure:

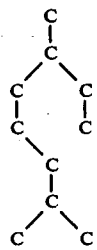

(BB-1)

Structure (BB-1) illustrates unsaturated mono-terpenes having ten carbon atoms and three carbon to carbon double bonds.

Such unsaturated compounds may be used as materials for component (b) of this invention. Illustrative examples of compounds having such a structure are: myrcene; ocimene; and alloocimene.

All three of the above illustrative compounds contain three carbon to carbon double bonds at least two of which are conjugated and are described in the paragraph on acyclic conjugated polyenes.

Mono-cyclic unsaturated terpenes of this invention may be represented by the following structure:

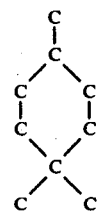

(BB-2)

Structure (BB-2) illustrates unsaturated mono-terpenes having ten carbon atoms and containing one or two carbon to carbon double bonds.

Such unsaturated compounds may be used as materials for component (b) in this invention. Illustrative examples of compounds having such a structure are: p-menth-3-ene; d,l-dipentene; and alpha-terpinene.

The first illustrative compound above was described in the paragraph on simple cyclic mono-olefins.

The second illustrative compound above was described in the paragraph on simple cyclic non-conjugated diolefins.

The third illustrative compound above was described in the paragraph on simple cyclic conjugated diolefins.

Bicyclic unsaturated terpenes of this invention may be represented by the following structures:

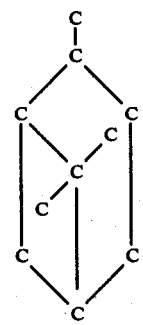 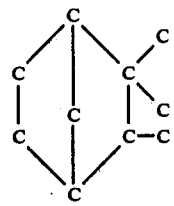

(BB-3)            (BB-4)

Structures (BB-3) and (BB-4) illustrate unsaturated mono-terpenes having ten carbon atoms and containing one carbon to carbon double bond.

Such unsaturated compounds may be used as materials for component (b) in this invention. Illustrative examples of compounds having such a structure are: alpha-pinene; beta-pinene; and camphene.

All these illustrative compounds were described in the paragraph on bicyclic mono-olefins.

Polycyclic unsaturated terpenes of this invention may be represented by the following structures:

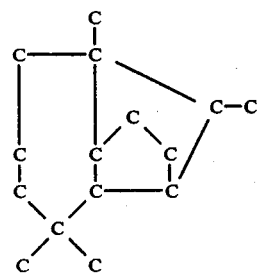 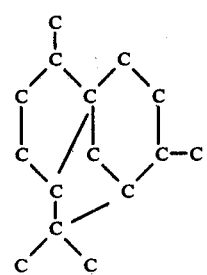

(BB-5)            (BB-6)

Structures (BB-5) and (BB-6) illustrate unsaturated sesquiterpenes having fifteen carbon atoms and containing one carbon to carbon double bond.

Such unsaturated compounds may be used as materials for component (b) in this invention. Illustrative examples of compounds having such a structure are: longifolene; and alpha-cedrene.

Both illustrative compounds were described in the paragraph on polycyclic mono-olefins.

The second principal component, component (b), in the reaction mixture may be at least one hydrocarbon-containing material selected from the group consisting of alpha olefins containing from 12 to 28 carbon atoms. Typically the commercially available alpha olefins used in the examples given have analytical values as shown in Tables III and IV.

It is to be understood that, in the practice of this invention, component (b) may be a single compound selected from any of the twenty-two groups of non-aromatic, unsaturated materials described as illustrative of component (b), or may be at least two or more compounds selected from any one of the twenty-two groups of such materials, or may be at least two or more compounds selected from any number of the twenty-two groups described earlier.

TABLE III

COMPONENT ANALYSIS AND TYPICAL PROPERTIES OF COMMERCIAL ALPHA OLEFINS

| NAME | Dodecene-1 | Tetra-decene-1 | Hexa-decene-1 | Octa-decene-1 |
|---|---|---|---|---|
| Specific Gravity (ASTM D 1298) 60°/60° F. | 0.763 | 0.776 | 0.782 | 0.792 |
| Flash Point, °F. Penske-Martin (ASTM D 93) | 180 | 225 | 270 | 310 |
| Color; Saybolt (ASTM D 156) | +30 | +30 | +30 | +30 |
| Freezing Point, °C. | — | — | 4 | 18 |
| Purity, Wt. % | | | | |
| n-Alpha Olefins | 94.0 | 93.0 | 92.0 | 90.8 |
| Mono-Olefins | 98.6 | 98.6 | 98.6 | 98.6 |
| Saturates | 1.4 | 1.4 | 1.4 | 1.4 |
| Distillation, °C. (ASTM D 1078) | | | | |
| 5% | 205 | 240 | 270 | 305[1] |
| 95% | 220 | 255 | 300 | 325 |

[1] ASTM D 850 (Modified)

TABLE IV

COMPONENT ANALYSIS AND TYPICAL PROPERTIES OF COMMERCIAL ALPHA OLEFIN FRACTIONS

| CARBON NUMBERS | C-14 To C-18 | C-20 To C-18 | C-24 To C-28 |
|---|---|---|---|
| Specific Gravity (ASTM D 1298) 60/60° F. | 0.787 | 0.799 | 0.819 |
| Flash Point, °F. COC (ASTM D 92) | 200 | 375 | 380 |
| Color, Saybolt (ASTM D 156) | +30 | +30 | +15 |
| Melting Point, °C. (ASTM D 127) | | 5 | 43 | 63 |
| Component Analysis | | | |
| C-14 | 19 Max. | — | — |
| C-16 | 36 Min. | — | — |
| C-18 | 36 Min. | 1 | — |
| C-20 | 5 Max. | 49 | — |
| C-22 | — | 42 | 1 |
| C-24 | — | 0.8 | 30 |
| C-26 | — | 0.1 | 39 |
| C-28 | — | — | 20 |
| C-30+ | — | — | 10 |
| Saturates, Wt. % | | 0.2 | 1.4 |
| Distillation, C. (ASTM D 850 Modified) | | | |
| 5% | | 272 | 340 | 369 |
| 95% | | 316 | 370 | Dec. |

Alpha olefins are commercially prepared either by a building up process of ethylene oligomerization (using either Ziegler or non-Ziegler catalysts systems) or by the wax-cracking and paraffin dehydrogenation processes. The former process gives high purity alpha olefins.

These production processes are well known in the art. Illustrative patents are U.S. Pat. Nos. 3,482,000 (1969-Gulf R&D), 3,689,584 (1972-Ethyl Corp.), and 3,391,318 (1968-UOP).

The second principal component (Component "b") of the present invention is typically present in an amount substantially less than the dicyclopentadiene component. For example, the second component may be present in an amount from about 5 percent to about 40 percent and more preferably from about 5 percent to about 30 percent and most preferably from about 5 percent to about 20 percent of the total weight of the three principal components in the initial reaction.

Applicant's U.S. Pat. No. 4,056,498 discloses that the third principal component (Component "c") in the initial reaction mixture is tall oil. The tall oil composition typically utilized is refined tall oil, i.e., crude tall oil which has been refined such as by distillation. The refined tall oil typically consists essentially of a predominate amount of tall oil fatty acids and a lesser amount of tall oil rosin acids. For example, the refined tall oil may contain from about 50 percent to about 70 percent fatty acids, and from about 30 percent up to less than about 50 percent rosin acids. Other tall oil compositions containing, for example, from about 10 percent to about 90 percent fatty acids and from about 90 percent to about 10 percent rosin acids may also be used. Tall oil and particularly refined or distilled tall oil are well known per se and the manner in which they are produced, derived or obtained is not a part of the present invention.

The tall oil may be present in the initial reaction mixture in an amount less than that of the dicyclopentadiene reactant component and, for example, may be present in an amount from about 10 percent to about 35 percent, based on the total weight of the three principal reactive components. Preferably, the tall oil is present in an amount from about 10 percent to about 30 percent by weight of the reaction mixture.

Applicant has taught in U.S. Pat. No. 4,189,410 that it may also be possible to employ as the third principal component (Component "c") of the initial reaction mixture at least one member selected from the group consisting of fatty acid-containing materials and rosin acid-containing materials.

The fatty acid-containing materials include saturated fatty acid-containing materials, unsaturated fatty acid-containing materials and mixtures thereof. Generally, the fatty acids in the fatty acid-containing materials are saturated or unsaturated monocarboxylic acids containing from about 12 to about 22 carbon atoms per molecule or mixtures thereof. Typical fatty acid-containing materials suited for incorporation as the third principal component (Component "c") in the initial reaction mixture include, e.g., vegetable acids, animal acids, fish acids and tall oil. The fatty acids contained in the third principal component (Component "c") in the initial reaction mixture may include olefinic fatty acids, diolefinic fatty acids, conjugated diolefinic acids, polyolefinic fatty acids and alicyclic fatty acids.

Typical fatty acid-containing materials include coconut oil, palm kernel oil, corn oil, cottonseed oil, olive oil, palm oil, peanut oil, sesame oil, sunflowerseed oil, lineseed oil, soybean oil, rapeseed (colza) oil, tung (China wood) oil and castor oil. Typical animal fatty acid-containing materials include lard and tallow. Typical fish fatty acid-containing materials include whale oil, gray seal oil, menhaden oil, cod liver oil, Japanese sardine oil, herring oil and California sardine (pilchard) oil. Typical saturated fatty acids include lauric acid, myristic acid, palmitic acid, margaric acid, stearic acid and arachidic acid. Typical olefinic fatty acids include undecylenic acid, lauroleic acid, physeteric acid, myristoleic acid, palmitoleic acid, hydnocarpic acid, petroselinic acid, oleic acid, elaidic acid, chaulomoogric acid and erucic (cis) acid. Typical diolefinic acids include alpha-linoleic acid. Typical conjugated diolefinic acids include alpha-eleostearic acid, beta-eleostearic acid and tung (China wood) oil. Typical polyolefinic acids include alpha-linoleic acid, alpha-eleostearic acid, beta-eleostearic acid and linolenic acid. Typical alicyclic fatty acids include hydnocarpic acid and chaulmoogric acid. The various fatty acid-containing materials are described in further detail in Kirk-Othmer Encyclopedia of Chemical Technology, Volume 8, pp 811–856 (1965) and Volume 1, pp. 224–240 (1963) herein incorporated by reference.

Typical rosin acid-containing materials suitable for incorporation as the third principal component (Component "c") in the initial reaction mixture include, e.g., rosins, particularly gum rosin, wood rosin and tall oil rosin. Rosin acids typically have the molecular formula $C_{20}H_{10}O_2$. The rosin acids contained in the third principal component (Component "c") of the initial reaction mixture may include, e.g., abietic acid, dehydro-abietic acids, paulustric acid, neo-abietic acid, isopimaric acid, dihydro-abietic acid, tetrahydroabietic acid, isodextropimaric acid, dextropimaric acid, pimaric acid, $\Delta 8,9$-isopimaric acid, sandara-copimaric acid, levo-pimaric acid, elliotinoic acid, dihydro-isopimaric acid, dihydro-pimaric acid, tetrahydro-isopimaric acid and tetrahydro-pimaric acid. The various rosins such as tall oil rosin, gum rosin and wood rosin acids are discussed in greater detail, e.g., in Kirk-Othmer Encyclopedia of Chemical Technology, Volume 17, pp. 475–508 (1968), which is herein incorporated by reference.

The tall oil composition typically utilized as the third principal component (Component "c") in the initial reaction mixture is refined tall oil, i.e., crude tall oil which has been refined such as by distillation. Its general composition is as already described in applicant's U.S. Pat. No. 4,056,498.

The fatty acid-containing material may be present in the initial reaction mixture in an amount less than that of the dicyclopentadiene reaction component and, for example, may be present in an amount from about 5 percent to about 35 percent based on the total weight of the three principal reactive components. Preferably, the fatty acid-containing material is present in an amount from about 10 percent to about 30 percent by weight of the reaction mixture.

The rosin acid-containing material may be present in the initial reaction mixture in an amount less than that of the dicyclopentadiene reactant component and, for example, may be present in an amount from about 5 percent to about 15 percent, preferably from about 5 percent to about 10 percent by weight of the reaction mixture.

In the present invention, the third principal component (Component "c") may be any of the various tall oil compositions, fatty acid-containing materials, or rosin acid-containing materials or mixtures thereof as previously described and disclosed in Applicant's U.S. Pat. Nos. 4,056,498 and 4,189,410. When tall oil or predominantly fatty acid-containing materials are used as component (c), the amounts used may be from about 5 percent to about 35 percent based on the total weight of the three principal reactive components. Preferably they are present in an amount from about 10 percent to about 30 percent by weight of the reaction mixture. When predominantly rosin acid-containing materials are used as components (c), the amounts used may be from about 5 percent to about 15 percent, preferably from about 5 percent to about 10 percent by weight of the reaction mixture.

As disclosed in applicant's U.S. Pat. No. 4,056,498, typically, the above-described three principal reactants or components (dicyclopentadiene or dicyclopentadiene-rich fraction, dimerized C-5 diene mixture, and tall oil) comprise at least about 80 percent of the total amount of polymerizable constituents of monomers of the reaction mixture, preferably comprise above about 90 percent of the total amount of polymerizable constituents of the reaction mixture, and most preferably comprise essentially 100 percent of the total amount of polymerizable constituents of the reaction mixture.

As taught by applicant in U.S. Pat. No. 4,189,410, if desired, aromatic olefinic monomers such as vinyltoluene, styrene, alpha-methylstyrene, indene, coumarone, methylcoumarone, dimethylstyrenes and methylindenes, or inert, aromatic diluents such as toluene, benzene, C-8 aromatics, cumene, ethyltoluenes, 1,2,4-trimethylbenzene, 1,2,3-trimethylbenzene, 1,3,5-trimethylbenzene, indane and naphthalene, may also be present in the reaction zone or mixture. Such materials may be present as described above in the first principal component (Component "a"). Alternatively, these materials may be present in the other principal components or may be incorporated separately into the reaction zone or mixture. The aromatic olefinic monomers may be separately incorporated in an amount such that there is present in the improved resins of the present invention less than about 35 percent reacted or combined aromatic olefinic monomers based on the total weight of the resin.

In the present invention, the three principal reactants, (components "a" plus "c") may comprise a similar proportion of the total amount of polymerizable constituents in the reaction mixture as taught by applicant's U.S. Pat. No. 4,056,498 or the reaction mixture may include, as taught by applicant's U.S. Pat. No. 4,189,410, an amount of aromatic olefinic monomers such that there is present in the improved resins of the present invention less than about 35 percent reacted or combined aromatic olefinic monomers based on the total weight of the resin.

Applicant's U.S. Pat. No. 4,056,498 discloses that the initial reaction mixture containing the dicyclopentadiene, dimerized C-5 diene mixture and tall oil may be polymerized over a wide range of temperatures as can be seen by one skilled in the art in view of the disclosure herein. For example, reaction temperatures may range from about 200° C. up to about 290° C., and preferably from about 230° C. to about 270° C. Applicant's U.S. Pat. No. 4,189,410 teaches additionally that this reaction temperature may most preferably be from about 245° C. to about 250° C.

Applicant's U.S. Pat. No. 4,056,498 discloses that the pressures employed in the initial reaction zone to produce the base resin are not thought to be critical, with the pressure sufficient to prevent substantial loss by evaporation of the reactants typically being used. Subatmospheric, atmospheric and superatmospheric pressures may be employed, and autogeneous pressure in a substantially sealed reaction vessel is typically convenient.

In the present invention the three principal reactants (Components "a", "b", and "c") may be polymerized or reacted at the same temperatures and pressures as taught by applicant's U.S. Pat. Nos. 4,056,498 and 4,189,410. Alternatively, the three principal reactants (components (a), (b), and (c)) may be polymerized or reacted in any sequence or combination to produce the novel resins of the present invention.

As disclosed in applicant's U.S. Pat. No. 4,056,498, if desired, inert diluents such as toluene or benzene may also be present in the reaction zone or mixture in an amount for example, of up to about 30 percent based on the total weight of the reaction mixture including the diluent.

As taught by applicant's U.S. Pat. No. 4,189,410, the inerts may be present in an amount of less than about 30 percent, and preferably less than about 15 percent based on the total weight of the three principal components of the reaction mixture including inerts.

In the present invention, the proportion of inerts in the reaction mixture is the same as that previously described and disclosed in applicant's U.S. Pat. Nos. 4,056,498 and 4,189,410.

As taught by applicant's U.S. Pat. No. 4,056,498, the initial polymerization reaction is typically characterized as a thermal polymerization and is most preferably conducted in the absence of any catalyst and, as described in applicant's U.S. Pat. No. 4,189,410, where the initial reaction mixture is thermally polymerized, temperatures of from about 200° C. to about 290° C., and preferably from about 230° C. to about 270° C. are typical.

Alternately, and as disclosed by applicant in U.S. Pat. No. 4,189,410, the initial reaction mixture containing the above described three principal reactants or components may be catalytically polymerized. Typical of catalysts which may be employed in the initial reaction are peroxides such as di-tert-butylperoxide; dilauroylperoxide; dicumylperoxide; 2,5-bis-(tert-butylperoxy)hexene; 2,5-dimethyl-2,5-bis(tert-butylperoxy)-hexene; dibenzoylperoxide; cumene hydroperoxide and/or Freidel-Crafts metal salt catalysts such as aluminum chloride, stannic chloride, boron trifluoride or the complex compounds of boron trifluoride, e.g., boron trifluoride hydrate, boron trifluoride ethyl ether, and boron trifluoride phenol. If catalysts are employed, it is possible to work at temperatures of e.g., from about −20° C. to about 270° C., preferably from about 40° C. to about 250° C.

In the present invention, the initial reaction mixture containing the three principal reactants or components may also be catalytically polymerized as described by applicant in U.S. Pat. No. 4,189,410.

As taught by applicant's U.S. Pat. Nos. 4,056,498 and 4,189,410 any conventional reactor vessel may be employed for this initial polymerization reaction, and the polymerization reaction may be conducted in a batch, semi-continuous or continuous manner. Preferably, the polymerization reaction is carried out under agitation, e.g., in a stirred reactor vessel. This same teaching regarding the reactor vessel applies to the present invention.

Applicant has taught in U.S. Pat. No. 4,056,498 that the initial reaction mixture of dicyclopentadiene, dimerized C-5 diene mixture and tall oil is typically maintained at reaction temperature until the desired degree of polymerization is reached. Typically, reaction is maintained until a base resin having a Ring and Ball softening point of from about 110° C. to about 170° C., more typically about 130° C. to about 160° C., and an Acid Number of less than about ten, and preferably less than about five, is produced. For example, reaction time may be from about twelve to about thirty-six hours and preferably from about sixteen to about twenty-four hours.

Applicant has taught in U.S. Pat. No. 4,189,410 that the reaction may also be maintained until a base resin having a Ring and Ball softening point of from about 120° C. to about 160° C., more typically from about 130° C. to about 150° C. (as measured by ASTM E 28, herein incorporated by reference), and an Acid Number of from about 1.5 to about 6, preferably from about 3 to about 5 is produced.

In the present invention it is preferred that the reaction be maintained until a base resin having a Ring and Ball softening point of from about 100° C. to about 170° C., more typically from about 125° C. to about 150° C. (as measured by ASTM E 28, herein incorporated by reference), and an Acid Number of from about 1.5 to about 10, more typically from about 3.0 to about 7.0 is produced.

Applicant has taught in U.S. Pat. No. 4,056,498 that the general range of base resin properties may include the following; a Ring and Ball softening point of from about 110° C. to about 170° C., more typically about 130° C. to about 160° C. (as measured by ASTM E 28, herein incorporated by reference); an Acid Number of less than about five (test procedure is specified in U.S. Pat. No. 4,056,498, Col. 6); and Gardner-Holdt solution viscosities at about 25° C. (bubble seconds) of from about 1.65 to about 9.0 (60% in 47 Kauri butanol gravure ink solvent) and from about 10 to about 1000 (50% in 31 Kauri butanol heat set ink solvent).

Applicant has taught in U.S. Pat. No. 4,189,410 that the general range of base resin properties may include the following; a color of up to about 3 (as measured by the Barrett visual method No. 106, herein incorporated by reference), preferably of up to about 2, or from about 9 to about 15 (as measured by the Gardner method ASTM D 1544, herein incorporated by reference), preferably from about 10 to about 13, a definite standard Stoddard solubility precipitation temperature (herein referred to as definite Stoddard solubility) of from less than about −60° C. to about +40° C., preferably from about less than −60° C. to about +10° C. (point of definite cloud as measured by the method set out in U.S. Pat. Nos. 2,565,222, 3,422,053, and 3,468,837 herein incorporated by reference), a resin mixed (normal heptane) aniline point (hereinafter resin aniline point) of from about 60° C. to about 110° C., preferably from about 70° C. to about 85° C., (as measured by ASTM D 1012, herein incorporated by reference), an ASTM Wijs Iodine number of from about 120 to about 200, preferably from about 130 to about 180 (as measured by ASTM D 1959, Wijs, herein incorporated by reference), and molecular weight (number average) of from about 800 to about 1500, preferably from about 900 to about 1200. The base resin exhibits Gardner-Holdt solution viscosities at 25° C. (bubble seconds) of from about 0.05 to about 8.00, preferably of from about 1.15 to about 6.30 (60% Wt. resin in 42 Kauri butanol gravure ink solvent) and from about 1.15 to about 50, preferably from about 3.20 to about 30 (50% Wt. resin in 30 Kauri butanol heat-set ink oil (herein referred to as Magie 470 oil). Reaction times for the initial reaction may range from about twelve hours to about thirty-six hours, and more typically may range from about sixteen to about twenty-four hours.

In the present invention, the general range of base resin properties may include the following: a color of from about 12 to about 18 (as measured by the Gardner method ASTM D 1544, herein incorporated by reference), preferably from about 13 to about 17; a definite standard Stoddard solubility precipitation temperature (herein referred to as definite Stoddard solubility) of from less than about −60° C. to about +40° C., preferably from about −50° C. to about +20° C. (point of definite cloud as measured by the method set out in U.S. Pat. Nos. 2,565,222, 3,422,053, and 3,468,837 herein incorporated by reference); a resin mixed (normal heptane) aniline point (thereinafter resin aniline point) of from about 40° C. to about 110° C., preferably from about 55° C. to about 85° C. (as measured by ASTM D 1012, herein incorporated by reference); an ASTM Wijs Iodine number of from about 120 to 200, preferably from about 130 to about 180 (as measured by ASTM D 1959, Wijs, herein incorporated by reference); and molecular weight (number average) of from about 750 to about 1500, preferably from about 900 to about 1300. The base resin exhibits Gardner-Holdt solution viscosities at 25° C. (bubble seconds) of from about 0.90 to about 15.0, preferably of from about 1.15 to about 8.00 (60% resin in 42 Kauri butanol gravure ink solvent) and from about 8.00 to about 100.0, preferably from about 10.00 to about 50.0 (50% resin in 30 Kauri butanol heat-set ink oil (herein referred to as Magie 470 oil). Reaction times for the initial reaction may range from about twelve hours to about thirty-six hours, and more typically may range from about sixteen to about twenty-four hours.

As disclosed by applicant in U.S. Pat. No. 4,056,498, the resulting hydrocarbon/tall oil base resin is typically recovered from the reaction mixture by conventional methods such as distillation, e.g., steam distillation or stripping; such recovery techniques are well known to those skilled in the art. Applicant teaches in U.S. Pat. No. 4,189,410 that other conventional recovery methods known to those skilled in the art may be used. Similar recovery methods may be used in the present invention.

As disclosed by applicant in U.S. Pat. No. 4,056,498 the resulting base resin may be used directly in various coating and/or printing compositions, but preferably is thereafter reacted with at least one ethylenically unsaturated lower aliphatic dicarboxylic acid or anhydride in an amount sufficient to produce a modified resin having an Acid Number higher than the Acid Number of the base resin. The higher Acid Number value is desirable for sufficient "wetting" of ink pigments in ink compositions, and the dibasic acid-modified resin typically also exhibits an increased Ring and Ball softening point and an increased solution viscosity in relatively low solvent power ink solvents at 50 to 60% Wt. resin concentration.

Applicant has taught in U.S. Pat. No. 4,189,410 that the modified resin is useful when incorporated into a gelled varnish formulation, e.g., with an ink oil and a gelling agent. The higher Acid Number value provides a resin having desirable gel characteristics in such formulations.

In this invention, the resulting base resin may also be used directly in various coating and/or printing compositions, but preferably is thereafter reacted with at least one ethlenically unsaturated lower aliphatic dicarboxylic acid or anhydride as described and for the same reasons as given in applicant's U.S. Pat. Nos. 4,056,498 and 4,189,410.

Applicant has disclosed in U.S. Pat. No. 4,056,498 that the ethylenically unsaturated lower aliphatic dicarboxylic acid or anhydrides found suitable for further reacting the base resin include maleic anhydride and fumaric acid. Maleic anhydride is most preferred and has been found to yield a modified resin having the best combination of properties for usage in heat-set and gravure printing ink compositions. Other ethylenically unsaturated lower aliphatic dicarboxylic acids or anhydrides which may be suitable include among others glutaconic acid, itaconic acid, citraconic acid, mesaconic acid and tetrahydrophthalic anhydride.

Additional illustrative compounds included in the above description which are specifically mentioned in applicant's U.S. Pat. No. 4,189,410; include half esters of maleic anhydride. Other compounds which may be suitable include glutaconic anhydride, itaconic anhydride, citraconic anhydride, methyltetrahydrophthalic acid, and methyltetrahydrophthalic anhydride, and tetrahydrophthalic acid.

In the present invention, any of the component (d) illustrative type compounds listed in applicant's U.S. Pat. Nos. 4,056,498 and 4,189,410 may be used for reaction with the base resin.

As indicated in applicant's U.S. Pat. Nos. 4,056,498 and 4,189,410, the base resin is reacted with an ethylenically unsaturated dicarboxylic acid or anhydride under conditions sufficient to increase the Acid Number of the base resin.

For example, from about one to ten parts of at least one ethylenically unsaturated lower aliphatic dicarboxylic acid or anhydride may be reacted with about ninety-nine to about ninety parts of the base resin, and preferably from about three to about five parts of the dicarboxylic acid or anhydride are reacted with about ninety-seven to about ninety-five parts of the base resin.

The reaction between the dicarboxylic acid or anhydride and the base resin may be conducted over a wide range of temperatures depending upon the specific dicarboxylic acid or anhydride chosen and the specific base resin used. For example, reaction temperatures from about 180° C. to about 250° C., and preferably from about 200° C. to about 240° C., may be used.

Applicant's U.S. Pat. No. 4,189,410 re-emphasizes that either the dicarboxylic acid or anhydride may be reacted with the base resin and suggests a most preferable reaction temperature of from about 210° C. to about 235° C. may be used.

In the present invention, the reaction between the dicarboxylic acid or anhydride and the base resin may be carried out generally at reaction temperatures from about 180° C. to about 250° C., preferably from about 200° C. to about 240° C., and most preferably from about 210° C. to about 235° C.

Applicant has disclosed in U.S. Pat. No. 4,056,498 that the reaction also is typically carried out in the absence of any catalyst, although a free radical initiator such as an organic peroxide, may be used.

Applicant has taught in U.S. Pat. No. 4,189,410 that di-tertiary butyl peroxide and dicumyl peroxide may be used and that when such a catalyst is employed, reaction temperatures from about 100° C. to about 250° C., preferably from about 150° C. to about 230° C. and most preferably from about 180° C. to about 220° C. may be used. A solvent or diluent may also be incorporated.

In the present invention, the same teachings apply to the use of peroxide catalysts for the reaction between the base resin and an ethylenically unsaturated lower aliphatic dicarboxylic acid or anhydride as is disclosed in applicant's U.S. Pat. Nos. 4,056,498 and 4,189,410.

Applicant has taught in U.S. Pat. No. 4,056,498 that the reaction pressures employed are not thought to be critical, with the pressure sufficient to prevent substantial loss by evaporation of the reactants typically being used. Subatmospheric, atmospheric and superatmospheric pressures may be employed. Most preferably, the reaction is conducted under substantially oxygen-free conditions to prevent darkening of the color of the resulting resin. Conveniently, the reaction can be conducted under an inert gas blanket such as by passing nitrogen or carbon dioxide gas through the reactor vessel and over the reaction mixture. Any conventional stirred or non-stirred reactor vessel may be employed for the reaction, the reaction may be conducted in a batch, semicontinuous, or continuous manner.

Applicant has further taught in U.S. Pat. No. 4,056,498 that the reaction between the anhydride or acid and the base resin is typically maintained at reaction temperature until the desired Acid Number is reached. Typically, the reaction will be maintained for a period sufficient to produce a modified resin having a Ring and Ball softening point of from about 110° C. to about 180° C., a color (Barrett) of less than about three, and an Acid Number (mg. KOH/gm. resin) of from about ten to about forty, and preferably having a Ring and Ball softening point of from about 130° C. to about 160° C., a color (Barrett) of up to about two, an Acid Number of from about fifteen to about thirty, and Gardner-Holdt solution viscosities at 25° C. (bubble seconds) of from about 1.65 to about 9.0, preferably 2.65 to about 8.0 (60%/Wt. resin in 47 Kauri butanol gravure ink solvent) and from about ten to about 1000, preferably about twenty to about sixty (50%/Wt. resin in 31 Kauri butanol heat-set ink solvent). For example, reaction times may range from about one hour to about ten hours, and more typically may range from about three to about six hours.

Applicant has taught in U.S. Pat. No. 4,180,410 that the use of additionally specified reactant material in the production of a base resin does not materially affect the properties of the modified resin. The reaction between the anhydride or acid and the base resin is typically maintained at reaction temperature until the desired Acid Number is reached. Typically, the reaction will be maintained for a period sufficient to produce a modified resin having a Ring and Ball softening point of from about 130° C. to about 175° C., preferably from about 140° C. to about 160° C., a color (as measured by the Barrett method) of less than about three, and preferably of less than about two, or a color (as measured by the Gardner method) from about nine to about fifteen, and preferably from about ten to about thirteen. The modified resin has a definite Stoddard solubility of from about 0° C. to about 120° C., preferably from about 20° C. to about 90° C., a resin aniline point of from about 40° C. to about 100° C., preferably from about 50° C. to about 90° C., an Acid Number of from about ten to about thirty, and preferably from about fifteen to about twenty-five, an ASTM Wijs Iodine number of from about 110 to about 190, preferably from about 120 to about 170 and a molecular weight (number average) of from about 820 to about 1520, preferably from about 920 to about 1220. The modified resin exhibits Gardner-Holdt solution viscosities at 25° C. (bubble seconds) from about 0.92 to about 15.0, preferably from about 1.15 to about 8.00 (60% wt. resin in 42 Kauri butanol gravure ink solvent) and from about 8.00 to about 100, preferably from about 10.0 to about 50.0 (50% wt. resin in Magie 470 oil). Reaction times may range from about one hour to about ten hours, for example, and more typically may range from about three to about six hours.

In this invention the reaction between the anhydride or acid and the base resin is typically maintained at reaction temperature until the desired Acid Number is reached. Typically, the reaction will be maintained for a period sufficient to produce a modified resin having a Ring and Ball softening point of from about 110° C. to about 180° C., preferably from about 130° C. to about 175° C., and most preferably from about 140° C. to about 160° C. The modified resin has a definite Stoddard solubility of from about −60° C., to about 120° C., preferably from about −20° C. to about 90° C., an Acid Number of from about ten to about forty, and preferably from about ten to about thirty, and most preferably from about fifteen to about 25, an ASTM Wijs Iodine number of from about 110 to about 190, preferably from about 120 to about 170 and a molecular weight (number average) of from about 750 to about 1500, preferably from about 900 to about 1300. The modified resin exhibits Gardner-Holdt solution viscosities at 25° C. (bubble seconds) from about 0.92 to about 15.0, preferably from about 1.15 to about 8.00 (60% wt. resin in 42 Kauri butanol gravure ink solvent) and from about 8.00 to about 100, preferably from about 10.0 to about 50.0 (50% wt. resin in 31 Kauri butanol gravure ink solvent), and from about 10 or about 10,000, preferably from about 100 to about 2,000 and most preferably from about 200 to about 1200 (60% wt. resin in 33-34 Kauri butanol reference oil-H.D.T.); and Hydrocarbon Dilution Tolerance values (60% wt. in 33-34 Kauri butanol reference oil-H.D.T.) may range from about 25 to about 1,000, preferably from about 50 to about 600, and most preferably from about 125 to about 250. Reaction times may range from about one hour to about ten hours for example, and more typically may range from about three to about six hours.

As disclosed by applicant in U.S. Pat. Nos. 4,056,498 and 4,189,410, "Acid Number" as used herein refers to a colorimetric method wherein approximately one gram of the resin is dissolved in 50 ml. of an Acid Number solution consisting of two parts of technical grade toluene, one part of technical grade isopropyl alcohol and a few drops of phenolphthalein indicator. The resin solution is then titrated with a 0.1 N alcoholic potassium hydroxide solution (methyl) to a slight pink color. The Acid Number is then calculated as follows:

Acid Number=(ml. KOH Soln.)×(5.61)/(grams RESIN)

The same Acid Number method is used in the present invention.

As taught by applicant in U.S. Pat. No. 4,056,498, the modified resin may then be recovered from the reaction mixture by conventional methods such as distillation, e.g., steam distillation or stripping, or other conventional recovery methods known to those skilled in this art.

In the present invention, the recovery of the modified resin from the reaction mixture is achieved by any of the conventional methods described in applicant's U.S. Pat. No. 4,056,498 and 4,189,410.

As taught by applicant in U.S. Pat. No. 4,056,498, the novel resins of the invention may be characterized a dibasic acid-modified hydrocarbon/tall oil resins. The resins typically have a Ring and Ball softening point (ASTM E 28) of from about 110° C. to about 180° C., and more typically from about 130° C. to about 170° C., and a resin color of not more than about three, and more typically less than about two (Barrett visual method No. 106). Molecular weight (number average) may range from about 500 to about 1500, and more typically from about 900 to about 1100. The resin may also have a degree of unsaturation corresponding to an iodine number of between about 100 and about 200, more typically from about 125 to about 150 (ASTM D 1959, Wijs). Specific Gravity at 25° C. may range from about 1.01 to about 1.15, more typically from about 1.05 to about 1.15.

Applicant has disclosed in U.S. Pat. No. 4,056,498 that the resin is soluble in a wide variety of solvents including typical aliphatic hydrocarbon solvents such as mineral spirits, n-heptane, methylcyclohexane, n-hexane, and n-decane. Advantageously, the acid modified resins of the present invention are soluble in gravure and heat set ink solvents. Gravure inks are generally thin and non-oily. Their viscosity range is generally from 100 to 300 centipoise, and these inks are often extended with whiting, china clay or other inexpensive fillers. Heat-set inks have a wide range of consistancy which can range from being very thick or viscous down to about 500 centipoise viscosity, which is generally suitable for high speed rotary presses.

As also indicated in applicant's U.S. Pat. No. 4,056,498, the acid-modified resins of the invention also exhibit "wetting" properties for ink pigments, and will release the ink solvent rapidly and completely at drying temperatures.

In the present invention, the modified resins have the same order of solubility in the same wide variety of heat-set and gravure ink solvents as disclosed is applicant's U.S. Pat. No. 4,056,498. As with the earlier described resins, the resins of the present invention also exhibit the same good "wetting" properties for ink pigments and the same desirable solvent release properties.

Applicant has also taught in U.S. Pat. No. 4,189,410 that the modified resins may also be prepared by simultaneously reacting the four principal reaction components. Alternatively the four principal reactants (components (a), (b), (c), and (d)) may be polymerized or reacted in any sequence or combination to produce the novel resins of the present invention.

In the present invention the acid-modified resins may also be prepared by simultaneously reacting the four principal reaction components. For example, the same proportion of components, i.e., either a predominant amount of component "a", or from about 40 percent to about 85 percent; either a lesser amount of component "b", or from about 5 percent to about 40 percent; either a lesser amount of component "c", or from about 5 percent to about 30 percent; and either a lesser amount of component "d" (an ethylenically unsaturated lower aliphatic dicarboxylic acid or anhydride; for example maleic anhydride) or from about 1 percent to about 10 percent may be heated in the reactor over a period of about three to about three and one-half hours to a temperature of from about 225° C. to about 270° C., preferably from about 240° C. to about 260° C., and most preferably from about 245° C. to about 250° C. and held at reaction temperature for a reaction period of from about 12 hours to about 36 hours, preferably from about 16 hours to about 24 hours.

Where the reactor is sealed and unstirred, maximum pressures obtained during reaction are about 110 pounds per square inch at the end of the reaction period. The reactor is allowed to cool to about 140° C. over a period of about one and one-half hours. The resulting viscous molten polymers are processed, e.g., by steam distillation to remove unreacted solvents and oils. Such steam distillation may be carried out at temperatures of up to about 250° C.

The same range of acid-modified resin properties are obtained as when the previously described two-step process is used to react a base resin made from components "a" plus "b" plus "c" with an ethylenically unsaturated lower aliphatic dicarboxylic acid or anhydride, such as maleic anhydride.

Applicant has taught in U.S. Pat. No. 4,189,410 that the resins of his invention exhibit an unexpectedly high level and wide range of solubility-compatibility properties which permit the resins to be employed in the preparation of a wide variety of ink formulations. The resins of his invention can thus be utilized in relatively low solubility ink formulations as well as in medium and high solubility ink formulations. Preferably, these resins provide a desirable balance or intermediate range of both solubility and compatibility properties. That is, the resins are not too soluble or too insoluble, or too compatible or too incompatible for the various ink formulations in which they may be utilized. This is quite significant when it is realized that the exact degree of solubility and compatibility required for a particular ink formulation varies widely among the possible formulations in which the resins of his invention may be utilized. This is also true of the resins of the present invention.

Applicant has further taught in U.S. Pat. No. 4,189,410 that several factors are helpful in defining the solubility-compatibility properties of the resins of his invention. These factors include properties such as definite Stoddard solubility, resin aniline point and dilution tolerance value. The latter of the properties reflects the weight percent of ink solvent or ink oil which can be added in a stepwise manner to a clear solution of a modified resin of his invention (40-60 weight percent solution of a resin in a particular ink solvent or ink oil) before a cloudiness appears in the solution. Titration is performed with the same solvent or oil in which the starting resin is dissolved. Generally a dilution tolerance value of from about 50 to about 200 (weight percent) is desirable.

A Hydrocarbon Dilution Tolerance test method is later described by which the resins of the present invention have been evaluated.

Applicant has disclosed in U.S. Pat. Nos. 4,056,498 and 4,189,410 that to be used in printing, the resins of his invention are dissolved with an appropriate solvent and carbon black or other desired colorant, and other conventional ingredients such as solid extenders, auxiliary polymeric binders and other functional organic or inorganic compounds may be included in the vehicle which is composed of resin dissolved in a hydrocarbon solvent which is usually aliphatic in nature. The preferred solvents for heat-set inks are highly refined hydrocarbon oils which are relatively high boiling and boil within a relatively narrow range, e.g., between about 230° C. and 330° C. Particularly preferred are essentially aliphatic solvents which have a boiling range that does not extend over more than about a 50° C. interval, e.g., between above 250° C. and about 300° C., and which have a Kauri butanol value of less than about 40 milliliters and preferably less than 35 milliliters (as compared to a value of 105 milliliters for toluene). In making up an ink composition, the hydrocarbon resin and carbon black or other pigment in powder form may be placed in a ball mill together with the solvent and mixed until a uniform dispersion of the pigment in the hydrocarbon solution is obtained. If desired, it is possible to prepare an ink concentrate in this fashion which is only subsequently diluted with additional solvent to the concentration appropriate for use in the printing operation. Typically, for instance, an ink composition used in a printing operation may contain between about 10 percent (weight) and about 50 percent (weight) of the resin, between about 100 parts to 200 parts of carbon black or other pigment or colorant per 100 parts of resin, the balance consisting essentially of an aliphatic hydrocarbon solvent.

All of the comments in the immediately preceding paragraph, describing teachings from applicant's U.S. Pat. Nos. 4,056,498 and 4,189,410, also apply in the present invention.

Applicant has illustrated his previous invention in U.S. Pat. No. 4,056,498 with a series of two specific examples, which follow immediately as Comparative Examples "A" and "B". It should be understood that all amounts and proportions of materials in Comparative Examples "A" and "B" are expressed on a weight basis unless otherwise indicated.

COMPARATIVE EXAMPLE "A"

In this run approximately 72.2% dicyclopentadiene-rich hydrocarbon fraction, 13.7% dimerized C-5 diene mixture and 14.2% distilled tall oil were fed to a stirred reactor having a total capacity of 13,000 gallons and a working capacity of 11,500 gallons. The dicyclopentadiene-rich hydrocarbon fraction had a composition of approximately 75% dicyclopentadiene and approximately 25% of dimethyldicyclopentadiene and codimers of cyclopentadiene and methylcyclopentadienes; the dimerized C-5 diene mixtures consisted essentially of about 75% by weight of dimers of isoprene, cis-piperylene and trans-piperylene, and codimers, trimers and cotrimers of isoprene, cis-piperlyene, trans-piperylene and cyclopentadiene, and about 25% by weight of higher polymers of isoprene, cis-piperylene, trans-piperylene and cyclopentadiene (sold as Chemex 1116); and the distilled tall oil contained approximately 51% monomeric fatty acids, approximately 8% dimerized fatty acids, approximately 6% esterified fatty acids, approximately 33% rosin acids, and approximately 2% unsaponifiables. The distilled tall oil had a Gardner color (ASTM D 1544) of about 7, and an Acid Number of about 180, saponification number was about 186, and specific gravity at 25° C. was 0.95.

The reaction mixture was agitated and heated for approximately 24 hours at about 255° C. (the reaction mixture was raised to 255° C. over an approximate 6 hour period). At the end of the reaction period, the reaction vessel was vented to remove volatiles, and thereafter steam distilled at 255° C. and atmospheric pressure until a base resin having a Ring and Ball softening point of about 143° C. was obtained.

Approximately ninety-seven parts by weight of the base resin were then reacted with about three parts by weight of maleic anhydride briquettes (2½ by 1½ inches) under an inert nitrogen blanket at a temperature of 210° C. for three hours under agitation.

The resulting maleic-modified hydrocarbon/tall oil resin was found to have a calculated weight percent composition of about 72% polymerized dicyclopentadiene fraction, about 8.3% polymerized dimerized C-5 diene, approximately 16.7% polymerized tall oil and approximately 3% reacted maleic anhydride. This maleic modified hydrocarbon/tall oil resin was further found to have a Ring and Ball softening point of 154° C., a color (Barrett) of ½+, an Acid Number (milligrams KOH/grams resin) of 20.7, molecular weight (number average) of 1020, a Gardner-Holdt solution viscosity at 25° C. (bubble seconds) of 32.7 (50% resin in Magie 470 heat-set ink solvent) and a Gardner-Holdt solution viscosity at 25° C. (bubble seconds) of 2.65–3.20 (60% resin in 47 Kauri butanol gravure ink solvent). Magie 470 gravure ink solvent has a specific gravity at 15.6° C. of 0.832, a Kauri butanol value of 31.2 and an Engler distillation (°C.) of I.B.P. 256; 50%–270; and E.P.-303.

A typical heat set ink formula utilizing this maleic modified hydrocarbon/tall oil resin consists of 55.7% resin varnish which in turn consists of 50% of the maleic modified resin in Magie 470 heat set ink solvent, 12.8% aluminum hydrate, 8.6% Phthalocyanine Blue, 2.15% polyethylene wax, and an additional 20.75% Magie 470 heat set ink solvent.

A typical gravure ink formula utilizing the maleic-modified resin consists of 50% resin solution, which in turn consists of 60% maleic modified resin in 47 Kauri butanol gravure ink solvent, 15% Duplex Barium Lithol Red pigment, 5% ethyl cellulose solutions which in turn consists of 25% ethyl cellulose in isopropanol, 10% "VM&P" naphtha hydrocarbon solvent and 2% toluene. (And 18% 42 Kauri butanol gravure ink solvent).

COMPARATIVE EXAMPLE "B"

This Comparative Example consists of four different runs utilizing the same procedure as set forth in Comparative Example "A" as follows.

In these four runs the reactor utilized for the initial reaction was an unagitated bench scale-unit having a total capacity of 1000 cc's and a working capacity of 750 cc's, the bench scale-unit being heated electrically. In all four runs the initial reaction was carried out for 16 hours at 250° C., with the time required for the reaction mixture to reach 250° C. being approximately three hours. After this reaction period, the bench scale-reactor was cooled to 140° C. and the contents transferred to a bench scale-distillation unit for steam distillation at 250° C. to recover the base resin. The base resin was thereafter reacted with maleic anhydride for three hours at about 225° C. under a nitrogen inert gas blanket and under agitation.

In Run 1, the feedstock to the initial reaction zone consisted of 60% of the dicyclopentadiene-rich hydrocarbon fraction, 19.7% of the dimerized C-5 diene mixture, and 20.3% of the distilled tall oil.

In Run 2, the feedstock to the initial reaction zone consisted of 70% of the dicyclopentadiene-rich hydrocarbon fraction, 9.7% of the dimerized C-5 diene mixture, and 20.3% of the distilled tall oil.

In Run 3, the feedstock to the initial reaction zone consisted of 70% of the dicyclopentadiene-rich hydrocarbon fraction, 14.7% of the dimerized C-5 diene mixture, and 15.3% of the distilled tall oil.

In Run 4, the feedstock to the initial reaction zone consisted of 70% of the dicyclopentadiene-rich hydrocarbon fraction, 19.7% of the dimerized C-5 diene mixture, and 10.3% of the distilled tall oil.

In Run 1, the resulting base resin had a Ring and Ball softening point of 117° C. and ninety-five parts of the base resin were reacted with five parts of maleic anhydride to yield a maleic modified resin having a Ring and Ball softening point of 130° C., a color (Barrett) of 1½+, an Acid Number of 29.8, and a Gardner-Holdt solution viscosity of 10 in the Magie 470 ink solution and 1.85 in the 47 Kauri butanol gravure ink solution.

In Run 2, the resulting base resin had a Ring and Ball softening point of 139° C. and an Acid Number of 4.5. Ninety-five parts of the base resin were reacted with five parts of maleic anhydride to yield a maleic modified resin having a Ring and Ball softening point of 154° C., a color (Barrett) of 1½+, an Acid Number of 27.4, and Gardner-Holdt solution viscosity of 60 in the Magie 470 ink solution and 4.00–5.00 in the 47 Kauri butanol gravure ink solution.

In Run 3, the resulting base resin had a Ring and Ball softening point of 146° C., and ninety-seven parts of the base resin were reacted with three parts of maleic anhydride to yield a maleic modified resin having a Ring and Ball softening point of 151° C., a color (Barrett) of 1½+, an Acid Number of 17.5, and Gardner-Holdt solution viscosity of 21 in the Magie 470 ink solution and 2.65 in the 47 Kauri butanol gravure ink solution.

In Run 4, the resulting base resin had a Ring and Ball softening point of 152° C. and an Acid Number of 1.5. In this run, ninety-five parts of the base resin were reacted with five parts of maleic anhydride to yield a maleic modified resin having a Ring and Ball softening point of 158° C., a color (Barrett) of two, an Acid Number of 26.4, and Gardner-Holdt solution viscosity of 23.3 in the Magie 470 ink solution and 2.65–3.20 in the 47 Kauri butanol gravure ink solution.

Applicant has also illustrated a previous invention in U.S. Pat. No. 4,189,410 with a series of eleven specific examples, which follow immediately as Comparative Examples "C" through "M".

It should be understood that all amounts and proportions of materials in Comparative Examples "C" through "M" are expressed on a weight basis unless otherwise indicated.

COMPARATIVE EXAMPLE "C"

In this run, approximately 750 grams of an initial reaction mixture consisting of essentially of approximately 72.0% of a dicyclopentadiene-rich hydrocarbon fraction, approximately 14.0% Debutanized Aromatic Concentrate-B (DAC-B) and approximately 14.0% distilled tall oil (as indicated in Table V) were charged to a thermal polymerization bomb and reacted for a period of about 19 hours at a temperature of from about 245° C. to about 250° C. The dicyclopentadiene-rich hydrocarbon fraction contained approximately 70% dicyclopentadiene. The distilled tall oil contained approximately 50% monomeric fatty acids, approximately 8% dimerized fatty acids, approximately 6% esterified fatty acids, approximately 33% rosin acid and approximately 2% unsaponifiables. The distilled tall oil had a Gardner number (ASTM D 1544) of about 7, and an Acid Number of from 180; saponification number was about 186, and specific gravity at 25° C. was about 0.95. At the end of the reaction period, a base resin was obtained having physical properties at set out in Table V.

About ninety-seven parts by weight of the base resin thus obtained were reacted with about three parts by weight of maleic anhydride under an inert nitrogen blanket at a temperature of from about 210° C. to about 235° C. for three hours.

The resulting maleic-modified hydrocarbon resin was found to have physical properties as set out in Table V.

A typical heat set ink formula utilizing this maleic-modified hydrocarbon resin consists of 55.7% resin varnish which in turn consists of 50% of a maleic-modified resin in Magie 470 heat set ink oil, 12.8% aluminum hydrate, 8.6% Phthalocyanine Blue, 2.15% polyethylene wax, and an additional 20.75% Magie 470 heat set ink oil.

A typical gravure ink formula utilizing the maleic-modified resin consists of 50% resin solution which in turn consists of 60% maleic-modified resin in 42 Kauri butanol gravure ink solvent, 15% Duplex Barium Lithol Red pigment, 5% ethyl cellulose solution which in turn consists of 25% ethyl cellulose in isopropanol, 10% "VM&P" naphtha hydrocarbon solvent, 2% toluene and 18% 42 Kauri butanol gravure ink solvent.

COMPARATIVE EXAMPLE "D"

This run was performed in the same manner as the run described in Comparative Example "C" immediately above, except that the Debutanized Aromatic Concentrate-B was substituted for with a mixture of approximately 2.8% isoprene and approximately 11.2% piperylene. The DCPD-rich fraction in this Example contained approximately 75% DCPD.

The base resin obtained in this run has physical properties as set out in Table V. After thermal maleation, the modified resin obtained had physical properties as set out in Table V.

Typical heat-set and gravure ink formulae may be prepared as in Comparative Example "C".

COMPARATIVE EXAMPLE "E"

This run was performed in the same manner as Comparative Example "D", except that essentially pure DCPD was used and the isoprene piperylene component was substituted for with approximately 20.0% of a C-5 olefin mixture consisting essentially of equal volume percents of 2-methyl-2-butene, 1-pentene, cis-2-pentene, mixed 2-pentene and cyclopentene, as indicated in Table V. The resulting base resin had physical properties as set out in Table V.

After the maleation as in Comparative Examples "C" and "D" the resulting maleic modified hydrocarbon resin was found to have physical properties as set out in Table V.

Typical heat-set and gravure ink formulae may be prepared as in Comparative Example "C".

TABLE V

COMPONENT AND PHYSICAL PROPERTY DATA FOR COMPARATIVE EXAMPLES C, D, AND E

|  | COMPARATIVE EXAMPLE "C" Wt. % | COMPARATIVE EXAMPLE "D" Wt. % | COMPARATIVE EXAMPLE "E" Wt. % |
|---|---|---|---|
| Component No. 1 | | | |
| DCPD | 48.0 | 55.4 | 62.7 |
| Methyl-DCPD | 7.6 | 0.4 | — |
| Miscellaneous Codimers | 5.9 | 6.4 | — |
| C-5's | 2.8 | 4.0 | — |
| Inerts | 7.7 | 5.8 | 3.3 |
| Styrene | — | — | — |
| Indene | — | — | — |
| Vinyltoluene | — | — | — |
|  | 72.0 | 72.0 | 72.0 |
| Component No. 2 | | | |
| DAC-B | 14.0 | — | — |
| Isoprene | — | 2.8 | — |
| Piperylene | — | 11.2 | — |
| C-5 Olefin Mixture | — | — | 20.0 |
|  | 14.0 | 14.0 | 20.0 |
| Component No. 3 | | | |
| Distilled Tall Oil | 14.0 | 14.0 | 14.0 |
| Total 3 Components | 100.0 | 100.0 | 100.0 |
| Base Resins | | | |
| Physical Properties Ring & Ball Softening Point, °C. | 142.5 | 142 | 126 |
| Resin Color (Barrett) | 1½ | 1½+ | 1½+ |
| Gardner Color (50% in Toluene) | 11 | 11 | 9+ |
| Standard Stoddard Solubility, °C. | −35/<−60 | −35/<−60 | −28/<−60 |
| Resin Aniline Point, °C. | 77.4 | 82.2 | 77.1 |
| ASTM Wijs Iodine No. | 167.4 | 169.5 | 144.2 |
| Acid No. | 3.93 | 3.78 | 5.33 |
| Gardner-Holdt solution viscosity at 25° C. (50%/Wt. resin in 470 Magie Oil) bubble seconds | 6.30-8.00 | 6.30-8.00 | 2.65 |
| Gardner-Holdt solution viscosity at 25° C. (60% resin in 42 Kauri butanol gravure ink solvent) bubble seconds | 1.15-1.45 | 1.45 | 5.0-0.68 |
| Molecular Weight (No. Average) | 937 | 950 | 881 |
| Maleic Modified Resins | | | |
| Physical Properties Ring & Ball Softening Point, °C. | 152 | 150 | 152 |
| Resin Color (Barrett) | 2 | 1½+ | 2+ |
| Gardner Color (50% in Toluene) | 12 | 11+ | 12+ |
| Standard Stoddard Solubility, °C. | 45/28 | 31/18 | 65/21 |
| Resin Aniline Point, °C. | 59.8 | 62.6 | 67.3 |
| ASTM Wijs Iodine No. | 158.7 | 161.8 | 125 |
| Acid Number | 17.1 | 17.95 | 18.5 |
| Gardner-Holdt solution viscosity at 25° C. (50% resin in 470 Magie Oil) bubble seconds | (X-Y) 15 | (X-Y) 14 | (V-W) 14 |
| Gardner-Holdt solution viscosity at 25° C. (60% resin in 42 Kauri butanol gravure ink solvent) bubble seconds | 2.15 | 2.15-2.65 | 1.80-2.15 |
| Molecular Weight (No. Average) | 984 | 1005 | 910 |

Test methods used to obtain the values in the table are identified in applicant's U.S. Pat. No. 4,189,410.

COMPARATIVE EXAMPLE "F"

This run is performed in a manner similar to Comparative Examples "C"–"E" except that the components therein were substituted for as follows:

(1) approximately 77.0% DCPD-rich hydrocarbon fraction (Contains approximately 40% DCPD and approximately 20% methyl DCPD)
(2) approximately 10.0% DAC-B, and
(3) approximately 13.0% distilled tall oil.

The base resin obtained has physical properties similar to the physical properties of the base resin of Comparative Examples "C"–"E". After thermal maleation in a manner similar to that of Comparative Examples "C"–"E", a modified resin is obtained having physical properties similar to the physical properties of the modified resins of Comparative Examples "C"–"E".

Typical heat set and gravure ink formulae may be prepared as in Comparative Example "C".

COMPARATIVE EXAMPLE "G"

This run is performed in a manner similar to Comparative Examples "C"–"E", except that the components therein were substituted for as follows:

(1) approximately 72.0% DCPD-rich hydrocarbon fraction (contains approximately 75% DCPD)
(2) approximately 14.0% DAC-B, and
(3) approximately 14.0% stearic acid.

The base resin obtained has physical properties similar to the physical properties of the base resins of Comparative Examples "C"–"E". After thermal maleation in a manner similar to that of Comparative Examples "C"–"E", a modified resin is obtained having physical properties similar to the physical properties of the modified resin of Comparative Examples "C"–"E".

Typical heat-set and gravure ink formulae may be prepared as in Comparative Example "C".

COMPARATIVE EXAMPLE "H"

This run is perfomed in a manner similar to Comparative Examples "C"–"E", except that the components therein were substituted for as follows:
(1) approximately 72.0% DCPD-rich hydrocarbon fraction (contains approximately 75% DCPD)
(2) approximately 14.0% DAC-C, and
(3) approximately 14.0% oleic acid.

The base resin obtained has physical properties similar to the physical properties of the base resin of Comparative Examples "C"–"E". After thermal maleation in a manner similar to that of Comparative Examples "C"–"E", a modified resin is obtained having physical properties similar to the physical properties of the modified resins of Comparative Examples "C"–"E".

Typical heat-set and gravure ink formulae may be prepared as in Comparative Example "C".

COMPARATIVE EXAMPLE "I"

This run is performed in a manner similar to Comparative Examples "C"–"E", except that the components therein were substituted for as follows:
(1) approximately 75.0% DCPD-rich hydrocarbon fraction (contains approximately 70% DCPD),
(2) approximately 14.0% DAC-B, and
(3) approximately 11.0% soya fatty acid.

The base resin obtained has physical properties similar to the physical properties of the base resins in Comparative Examples "C"–"E". After thermal maleation in a manner similar to that of Comparative Examples "C"–"E", a modified resin is obtained having physical properties similar to the physical properties of the modified resin of Comparative Examples "C"–"E".

Typical heat-set and gravure ink formulae may be prepared as in Comparative Example "C".

COMPARATIVE EXAMPLE "J"

This run is performed in a manner similar to Comparative Examples A"C"–"E", except that the components therein were substituted for as follows:
(1) approximately 80.0% methyl DCPD
(2) approximately 15.0% DAC-B, and
(3) approximately 5.0% gum rosin.

The base resin obtained has physical properties similar to the physical properties of the base resin of Comparative Examples "C"–"E". After thermal maleation in a manner similar to that of Comparative Examples "C"–"E", a modified resin is obtained having physical properties similar to the physical properties of the modified resins of Comparative Examples "C"–"E".

Typical heat-set and gravure ink formulae may be prepared as in Comparative Example "C".

COMPARATIVE EXAMPLE "K"

This run is performed in a manner similar to Comparative Examples "C"–"E", except that the components therein were substituted for as follows:
(1) approximately 72.0% DCPD-rich hydrocarbon fraction (contains approximately 70% DCPD)
(2) approximately 23.0% DAC-C, and
(3) approximately 5.0% wood rosin.

The base resin obtained has physical properties similar to the physical properties of the base resins of Comparative Examples "C"–"E". After thermal maleation in a manner similar to that of Comparative Examples "C"–"E", a modified resin is obtained having physical properties similar to the physical properties of the modified resins of Comparative Examples "C"–"E".

Typical heat-set and gravure ink formulae may be prepared as in Comparative Example "C".

COMPARATIVE EXAMPLE "L"

In this run, approximately 750 grams of an initial reaction mixture consisting essentially of approximately 81.0% of a DCPD-rich hydrocarbon fraction, approximately 14.0% DAC-B and approximately 5.0% stearic acid are catalytically polymerized in the presence of a catalytically effective amount of aluminum chloride for a period of about four hours at a temperature from about 25° C. to about 75° C. The DCPD-rich hydrocarbon fraction contians approximately 40% DCPD and approximately 20% methyl DCPD. An inert diluent is present to control the reaction progress. At the end of the reaction period, a base resin is obtained having physical properties similar to the physical properties of the base resin in Comparative Examples "C"–"E".

About ninety-seven parts by weight of the base resin are reacted with about three parts by weight of maleic anhydride in the presence of a catalytically effective amount of an organic peroxide.

A maleic-modified hydrocarbon resin is obtained having physical properties similar to the physical properties of the modified resin of Comparative Examples "C"–"E".

Typical heat-set and gravure ink formulae may be prepared as in Comparative Example "C".

COMPARATIVE EXAMPLE "M"

In this run, approximately 750 grams of initial reaction mixture consisting essentially of approximately 70.0% DCPD-rich hydrocarbon fraction, approximately 13.0% DAC-B, approximately 14.0% oleic acid and approximately 3.0% maleic anhydride are charged to a thermal polymerization bomb and reacted for a period of about 24 hours at a temperature of about 245° to about 250° C. The DCPD-rich hydrocarbon fraction contains approximately 75% DCPD. At the end of the reaction period, a resin is obtained having physical properties similar to the physical properties of the modified resins of Comparative Examples "C"–"E".

Typical heat-set and gravure ink formulae may be prepared as in Comparative Example "C".

The present invention will now be illustrated in terms of specific examples. In these examples, as well as in the other parts of the present specification and appended claims, it should be understood that all amounts and proportions of materials are expressed on a weight basis unless otherwise indicated.

The various component (b) materials used in the next 22 examples are described in Table III (Commercial alpha-olefins), Table IV (alpha olefin fractions), and Table VI (olefins and hydrocarbon diluent).

The next 22 examples illustrating the present invention are discussed in a sequence of four groups: the first group of 5 examples used as component (a) a DCPD material containing approximately 77.6% DCPD and 0.4% of methyl and dimethyl-DCPD and as component (b) used an olefin mixture in Example 1 and alpha-olefins in Examples 2–5. Results are given in Table VII.

The second group of 10 examples used as component (a) a DCPD material containing approximately 72.4% DCPD and 5.0% of methyl and dimethyl DCPD; and as component (b) a variety of five different alpha-olefin materials. Results are given in Table VIII.

The third group of 3 examples used as component (a) DCPD materials ranging from 66.4–74.6% DCPD and from 10.6–3.1% of methyl and dimethyl DCPD, and as component (b) used as alpha-olefin, an olefin mixture, and an illustrative material from U.S. Pat. Nos. 4,056,498 and 4,189,410. Results are given in Table IX.

The fourth and final group of 4 examples used as component (a) a DCPD material containing approximately 73.9% DCPD and 5.0% of methyl and dimethyl DCPD, and as component (b) a variety of 3 different alpha-olefin materials. Results are given in Table X.

Of the 6 different structural kinds of mono-olefins described in some detail earlier and further identified by drawings of chemical structures and by illustrative compounds, the acyclic mono-olefins (alpha olefins) are used as component (b) in 19 of the 22 examples which follow. The acyclic mono-olefins (olefin mixtures) are used as component (b) in 2 of the 22 examples (Examples No. 1-diisobutylene and Example No. 16-mixed nonenes, or propylene trimer).

The test procedures used are identified in the respective Tables, VII, VIII, IX and X, except for the Hydrocarbon Dilution tolerance test procedure, a measure of resin solubility in and compatibility with ink oils, which is described as follows.

Hydrocarbon Dilution Tolerance as used herein refers to a solubility method wherein 10.0±0.1 gram of a 60%/Wt. solution of the resin in an ink oil (6.0 gms. resin and 4.0 grams ink oil) are weighed into a 50 ml. beaker (for higher values, larger beakers may be used) using a clean stainless steel spatula (tapered blade: 14×9 mm×85 mm long), the temperature is adjusted to 25°±2° C. and titrated by an ink oil until a turbidity (cloud point) is observed (as described below).

Using a medicine dropper, an ink oil (same oil as that used in the initial 60%/wt. resin solution) is added in portions of 0.5–1.0 ml. After each addition the ink oil is thoroughly stirred into the resin solution using the spatula. Ink oil additions are continued until the cloud point as described below is reached.

The cloud point is that point at which definite turbidity is observed. The end point is that point at which the spatula blade, resting diagonally in the beaker, can no longer be seen at the solution level when viewed against reflected light. The solution becomes cloudy due to precipitation of the resin due to the particular resin concentration in ink oil being attained at the 25° C. temperature.

The test is to be run as rapidly as possible, as cloud point is time dependent. The titration is not to be interrupted once the test has begun. After the cloud point is reached, weigh to the nearest 0.1 gm. the beaker and its contents.

The Hydrocarbon Dilution Tolerance value (H.D.T.) is calculated as follows:

$$H.D.T., \text{ wt. } \% = \frac{B - A}{C} \times 100$$

where
A = Total weight before titration
B = Total weight after titration
C = Weight of resin solution sample and results are reported to the nearest 1 wt. % unit.

Duplicate test results by the same analyst should be repeated if they differ by more than 5%, and test results by different analysts should be repeated if they differ by more than 10%.

High numerical H.D.T. values (250–500) indicate resins having excellent ink oil solubility; while low numerical H.D.T. values (125) indicate resins having a lesser degree of ink oil solubility.

As applicant has taught in U.S. Pat. No. 4,189,410, this H.D.T. test measure of the solubility-compatibility properties of these resins may use any desired ink oil, provided the titration is performed with the same solvent or oil in which the starting resin is dissolved.

In this invention, the H.D.T. test values are determined using an ink oil having the following properties:

| | |
|---|---|
| 1. Saybolt Color | +15 to +30 |
| 2. Specific Gravity | (30/15.6° C.) = .792–.796 |
| 3. Refractive Index | (25° C.) 1.4410–1.4435 |
| 4. Aniline Point, °C. | 80–83 |
| 5. Kauri-butanol value | 33–45 |
| 6. Boiling Range, °C. | I.B.P. (240–243); 5% (245–249); 50% (257–260); 95% (273–280); E.P. (275–280) |

EXAMPLE I

In this example, as indicated in Table VII, approximately 640 grams (700 ml.) of an initial reaction mixture consisting of approximately 68.9% of a dicyclopentadiene-rich hydrocarbon fraction, approximately 9.4% of diisobutylene, approximately 12.6% of a refined tall oil, and approximately 9.1% of a hydrocarbon diluent were charged to a thermal polymerization bomb and reacted for a period of about 19 hours at a temperature of from about 245° to about 250° C. The dicyclopentadiene-rich hydrocarbon fraction contained approximately 77.6% dicyclopentadiene, 0.4 wt.% methyl and dimethyl DCPD, and 9.1% miscellaneous C-10 to C-12 codimers. The properties of diisobutylene, commercial grade, and of the hydrocarbon diluent are listed in Table VI. The diluent used (Hydrocarbon Diluent No. 1) was a by-product from a petroleum resin polymerization process.

The distilled tall oil contained approximately 50% monomeric fatty acids, approximately 8% dimerized fatty acids, approximately 6% esterified fatty acids, approximately 33% rosin acid and approximately 2% unsaponifiables. The distilled oil had a Gardner color (ASTM D 1544) of about 7, an acid number of about 180, a saponification number of about 186, and a specific gravity at 25° C. of about 0.95.

At the end of the reaction period, 458.5 grams of a base resin was obtained having the physical properties shown in Table VII.

About ninety-seven parts by weight of the base resin thus obtained were reacted with about three parts by weight of maleic anhydride under an inert nitrogen blanket at a temperature of from about 210° C. to about 230° C. for about three hours.

The resulting maleic-modified hydrocarbon resin was found to have physical properties as set out in Table VII.

TABLE VI
COMPONENT ANALYSIS AND TYPICAL PROPERTIES OF OLEFINS AND HYDROCARBON DILUENT

| | Diisobutylene | Mixed Nonenes | Hydrocarbon Diluent No. 1 |
|---|---|---|---|
| Specific Gravity (ASTM D 1298) | 0.7227 | 0.744 | 0.90 |

TABLE VI-continued
COMPONENT ANALYSIS AND TYPICAL PROPERTIES OF OLEFINS AND HYDROCARBON DILUENT

|  | Diiso-butylene | Mixed Nonenes | Hydrocarbon Diluent No. 1 |
|---|---|---|---|
| 60/60° F. |  |  |  |
| Flash Point, °F. | 20 | 78[1] | 75[2] |
| Color | Colorless | 15 Max. | 2-5 |
| Boiling Range | 278–292° F. | 101–104° C. | 90–300° C. |
| Component Analysis |  |  |  |
| Olefins | Approx 95–99 | Approx 95–99 | — |
| 1-Olefin | 74.9[7] | Approx[9] 5–14 | — |
| 2-Olefin | 20.7[7] | Approx[9] 85–94 | — |
| Total No. of Components | 9[8] | 31[10] | — |
| Below C-8 Hydrocarbons | — | — | 27.5[3] |
| C-8 Hydrocarbons | 99 | — | 27.9[4] |
| C-9 Hydrocarbons | — | 99 | 36.9[5] |
| C-10, C-11 Hydrocarbons | — | — | 7.7[6] |

[1]TOC (ASTM D 1310)
[2]COC (ASTM D 92)
[3]Benzene, Toluene, etc.
[4]Ethylbenzene, Xylenes
[5]Trimethylbenzenes, ethyltoluenes, cumene, indane, etc.
[6]Naphthalenes, methylindanes, etc.
[7]The 1-olefin in diisobutylene is 2,2,4-trimethyl-1-pentene and the 2-olefin is 2,4,4-trimethyl-2-pentene.
[8]A more general discussion on the composition of commercial diisobutylene appears in "identification of Pure Organic Compounds" by E. H. Huntress and S. P. Mulliken, Wiley and Sons, 1941 p 585–586.
[9]A more general discussion on the composition of mixed nonenes (propylene trimer) appears in "Encyclopedia of Chemical Technology." Kirk-Othmer, Wiley and Sons. Vol 16 p 581–528, 1978.
[10]The sample of mixed nonenes (propylene trimer) used contained one component of 11.04%, six components between 5 and 10% (sum of these six components - 38.7%), eleven components between 2 and 5% (sum of these eleven components - 36.03% and thirteen components of less than 1% (sum of these thirteen components 14.23%).

EXAMPLE 2

In this example, as indicated in Table VII, approximately 650 grams (700 ml.) of an initial reaction mixture consisting of approximately 73.7% of a dicyclopentadiene-rich hydrocarbon fraction, approximately 11.9% of C-16 alpha olefin, and approximately 14.4% of refined tall oil were charged to a thermal polymerization bomb and reacted for a period of about 19 hours at a temperature of from about 245° to about 250° C. The same dicyclopentadiene-rich hydrocarbon fraction containing approximately 77.6% dicyclopentadiene was used as in Example 1. The C-16 alpha olefin was a commercial grade having properties shown in Table III. The same distilled tall oil was used as in Example 1.

At the end of the reaction period, 513.7 grams of a base resin was obtained having the physical properties shown in Table VII.

EXAMPLE 3

This was a repeat of Example 2 in which the amount of the C-16 alpha olefin used was reduced about half to 6.8%; the amount of the refined tall oil used remained the same; and the amount of added diluent used (Hydrocarbon Diluent No. 1—See Table VI) was increased from zero to 6.4%.

At the end of the reaction period, a base resin was obtained having the physical properties shown in Table VII.

EXAMPLE 4

In this example, as indicated in Table VII, approximately 660 grams (700 ml.) of an initial reaction mixture consisting of approximately 70.5% of a dicyclopentadiene-rich hydrocarbon fraction, approximately 10.6% of a C-20 to C-24 alpha olefin fraction, approximately 10.1% of refined tall oil, and approximately 8.8% of a diluent were charged to a thermal polymerization bomb and reacted for a period of about 19 hours at a temperature of from about 245° to about 250° C. The same dicyclopentadiene-rich hydrocarbon fraction containing approximately 77.6% dicyclopentadiene was used as in Example 2. The C-20 to C-24 alpha olefin fraction was a commercial grade having properties shown in Table IV. The same distilled tall oil was used as in Example 1. The diluent used (Hydrocarbon Diluent No. 1) was a by-product from a petroleum resin polymerization process and had the properties listed in Table VI.

At the end of the reaction period, 501.1 grams of a base resin was obtained having the physical properties shown in Table VII.

EXAMPLE 5

This was a repeat of Example 4 in which the amount of the dicyclopentadiene-rich material used stayed the same; the amount of the C-20 to C-24 alpha olefin fraction used was reduced to 8.5%; the amount of the refined tall oil used was increased to 12.2%; and the amount of the diluent used (Hydrocarbon Diluent No. 1) remained the same—See Tables VII and VI.

At the end of the reaction period, 415.0 grams of a base resin was obtained having physical properties shown in Table VII.

In each of Examples 1 through 5, a base resin was recovered with properties shown in Table VII; each base resin was reacted with maleic anhydride as described in Example 1; and the resulting maleic-modified hydrocarbon resin was found to have physical properties as shown in Table VII.

A typical heat-set ink formula, utilizing a maleic-modified hydrocarbon resin consists of 76% resin varnish (which in turn consists of 50 Wt.% of a maleic-modified resin in 31 Kauri butanol heat-set ink oil); 8.6% Phthaloycanine blue; 2.0% Cabosil; 2.15% polyethylene wax; and 11.25% heat-set ink oil (31 Kauri butanol value). Suitable heat-set inks utilizing the maleic-modified resins of Examples 1 to 5 may be prepared.

A typical publication gravure (type "A") formula utilizing the maleic-modified resin, consists of 50% resin varnish, (which in turn consists of 60 Wt.% of a maleic-modified resin in 42 Kauri butanol gravure ink solvent); 10% benzidene yellow; 1.5% ethylhydroxyethylcellulose (EHEC-dry basis); 5.0% polyethylene wax compound; and 33.5% gravure ink solvent (42 Kauri butanol value). Suitable gravure inks utilizing the maleic-modified resins of Examples 1 to 5 may be prepared.

TABLE VII

COMPONENT AND PHYSICAL PROPERTY DATA FOR EXAMPLES 1-5

| | Example 1 Wt. % | Example 2 Wt. % | Example 3 Wt. % | Example 4 Wt. % | Example 5 Wt. % |
|---|---|---|---|---|---|
| Component (a) | | | | | |
| Dicyclopentadiene | 53.5 | 57.1 | 56.1 | 54.7 | 54.7 |
| Methyl dicyclopentadiene | 0.3 | 0.3 | 0.3 | 0.3 | 0.3 |
| Dimethyl dicyclopentadiene | — | — | — | — | — |
| Misc. Codimers ($C_{10}$–$C_{12}$) | 6.3 | 6.8 | 6.6 | 6.4 | 6.4 |
| Vinylnorbornenes | — | — | — | — | — |
| Methylbicyclononadienes | 0.3 | 0.4 | 0.4 | 0.4 | 0.4 |
| C-5's | — | — | — | — | — |
| Inerts | 8.5 | 9.1 | 9.0 | 8.7 | 8.7 |
| Styrene | — | — | — | — | — |
| Indene | — | — | — | — | — |
| Vinyltoluenes | — | — | — | — | — |
| | 68.9 | 73.7 | 72.4 | 70.5 | 70.5 |
| Component (b) | | | | | |
| Carbon No. | 8 | 16 | 16 | 20-24 | 20-24 |
| Diisobutylene | 9.4 | — | — | — | — |
| Alpha Olefin | — | 11.9 | 6.8 | 10.6 | 8.5 |
| | 9.4 | 11.9 | 6.8 | 10.6 | 8.5 |
| Component (c) | | | | | |
| Refined Tall Oil | 12.6 | 14.4 | 14.4 | 10.1 | 12.2 |
| Hydrocarbon Diluent No. 1 | 9.1 | — | 6.4 | 8.8 | 8.8 |
| TOTALS | 100.0 | 100.0 | 100.0 | 100.0 | 100.0 |
| Base Resins | | | | | |
| Physical Properties | | | | | |
| Ring & Ball Softening Point, °C.[1] | 140 | 135 | 140 | 138 | 142 |
| Acid Number[2] | 4.2 | 3.4 | 5.3 | 3.1 | 3.1 |
| Resin Color[3] | 0.5 | 0.6 | 0.7 | 0.5 | 0.6 |
| Standard Stoddard Solubility, °C.[4] | −14/−31 | <−60/<−60 | −3/<−60 | +14/−38 | −9/−43 |
| Wijs Iodine Number[5] | 168 | 133 | 150 | 153 | 149 |
| Base Resin Yield, Wt. % (Distillation Charge) | 77.8 | 83.9 | 85.2 | 80.4 | 65.8* |

*Low due to spillage
Test Methods:
[1]ASTM E-28
[2]As described elsewhere in present invention.
[3]Modified Barrett method, usting % Light Transmission (Photoelectric).
[4]Temperature of indefinite and definite cloud points, using method described in U.S. Pat. Nos. 2,565,222; 3,422,053; and 3,468,837.
[5]ASTM D-1959.

| Maleic Modified Resins | | | | | |
|---|---|---|---|---|---|
| Physical Properties | | | | | |
| Ring & Ball Softening Point, °C.[1] | 154 | 142 | 146 | 144 | 149 |
| Gardner-Holdt Solution Viscosity at 25° C. (60%/Wt. resin in 33-34 Kauri butanol reference oil - H.D.T.)- Bubble Seconds.[2] | 366 | — | 550 | Methods; 485 | — |
| Hydrocarbon Dilution Tolerance (H.D.T.) (60%/Wt. resin in 33-34 Kauri butanol reference oil - H.D.T.) Wt. %[3] | 66 | — | 125 | 178 | 135 |
| Acid Number[4] | 18.8 | 17.6 | 19.1 | 17.4 | 17.7 |
| Resin Color[5] | 0.9 | 0.9 | 1.3 | 0.9 | 1.0 |
| Standard Stoddard Solubility, °C.[6] | Hazy/+62 | −4/−16 | Hazy/+48 | Hazy/+7 | +49/+31 |
| Wijs Iodine Number[7] | 150 | 134 | 138 | 143 | 138 |

Test ethods:
[1]ASTM E-28
[2]Using the Gardner-Holdt Viscosity Tube Standards in ASTM D 1545.
[3],[4]As described elsewhere in present invention.
[5]Modified Barrett method, using % Light Transmission (Photoelectric).
[6]Temperature of indefinite cloud points, using method described in U.S. Pat. Nos. 2,565,222; 3,422,053; and 3,468,837.
[7]ASTM D 1959.

EXAMPLE 6

In this example, as indicated in Table VIII, approximately 650 grams (700 ml.) of an initial reaction mixture consisting of approximately 72.7% of a dicyclopentadiene-rich hydrocarbon fraction, approximately 5.9% of C-16 alpha olefin, approximately 12.4% of refined tall oil and approximately 9.0% of a diluent were charged to a thermal polymerization bomb and reacted for a period of about 19 hours at a temperature of from about 245° to about 250° C. The dicyclopentadiene-rich hydrocarbon fraction contained approximately 72.4% dicyclopentadiene, 5.0% methyl and dimethyl dicyclopentadienes and 8.8% miscellaneous C-10 to C-12 codimers. The C-16 alpha olefin was a commercial grade having the properties shown in Table III. The diluent used (Hydrocarbon Diluent No. 1) was a by-product from a petroleum resin polymerization process and had the properties listed in Table VI.

The distilled tall oil contained approximately 50% monomeric fatty acids, approximately 8% dimerized fatty acids, approximately 6% esterified fatty acids, approximately 33% rosin acid and approximately 2% unsaponifiables. The distilled tall oil had a Gardner color (ASTM D 1544) of about 7, an acid number of about 180, a saponification number of about 186, and a specific gravity at 25° C. of about 0.95.

At the end of the reaction period, 491.8 grams of a base resin was obtained having the physical properties shown in Table VIII.

About ninety-seven parts by weight of the base resin thus obtained were reacted with about three parts by weight of maleic anhydride under an inert nitrogen blanket at a temperature of from about 210° to about 235° C. for about three hours.

The resulting maleic-modified hydrocarbon resin was found to have the physical properties shown in Table VIII.

EXAMPLE 7

This was a repeat of Example 6 in which the amount of the dicyclopentadiene-rich material used was slightly increased to 73.9%; the amount of the C-16 alpha olefin used was increased slightly to 6.8%; the amount of the refined tall oil used was slightly reduced to 10.3%; and the amount of added diluent (see Table VI for properties) remained the same. A slightly longer initial reaction time of about 24 hours at about 245° to about 250° C. was used. This same longer time was also used in all but the last of the remaining Table VIII reactions. The dicyclopentadiene-rich hydrocarbon fraction contained component proportions which were very slightly different from those in Example 6; 72.5% DCPD, 4.6% methyl and dimethyl dicyclopentadienes and 8.6% miscellaneous C-10 to C-12 codimers.

At the end of the reaction period, 509.1 grams of the base resin was obtained having the physical properties shown in Table VIII.

EXAMPLE 8

This example used a C-18 alpha olefin (see Table III). In other respects it was similar to Example 7 except that the amount of the dicyclopentadiene-rich material used was slightly reduced to 72.1%: the amount of the C-18 alpha olefin used was significantly increased to 10.3%; the amount of the refined tall oil used remained the same; and the amount of added diluent used was slightly reduced to 7.2%. An initial reaction time of about 24 hours at about 245° to about 250° C. was used. The dicyclopentadiene-rich hydrocarbon fraction contained component proportions which were very slightly different from those used in Examples 6 or 7; 73.4% DCPD, 3.9% methyl and dimethyl dicyclopentadienes, and 8.7% miscellaneous C-10 to C-12 codimers.

At the end of the reaction period, 514.1 grams of base resin was obtained having the physical properties shown in Table VIII.

EXAMPLE 9

This was a repeat of Example 8 in which the amount of dicyclopentadiene-rich material was slightly increased to 73.9%; the amount of the C-18 alpha olefin was significantly reduced to 8.6%; the amount of the refined tall oil remained the same; and the amount of added hydrocarbon diluent (see Table VI for properties) also remained the same. An initial reaction time (as in Examples 7 and 8) of about 24 hours at about 240° to about 245° C. was used.

A dicyclopentadiene-rich fraction having the same composition as in Example 7 was used.

At the end of the reaction period, 522.0 grams of a base resin was obtained having the physical properties shown in Table VIII.

EXAMPLE 10

Example 9 was repeated exactly in every way, except that in the recovery of the base resin product by steam distillation at about 245° to about 250° C. pot temperature, the total time and amount of steam used was increased by about 75-85% in an attempt to obtain a higher base resin softening point.

At the end of the reaction period, 521.0 grams of a somewhat higher softening point base resin was obtained having the physical properties shown in Table VIII.

EXAMPLE 11

This was a repeat of Example 9 in which the amount of the dicyclopentadiene-rich material remained the same; the amount of the C-18 alpha olefin was significantly reduced to 6.9%; the amount of the refined tall oil remained the same; and the amount of added diluent (see Table VI for properties) was increased slightly to 9.0%.

In this example, as in all of the remaining Table VIII reactions (Examples 12-15), the dicyclopentadiene-rich fraction was the same as that in Examples 7, 9, and 10.

At the end of the reaction period, 514.2 grams of a base resin was obtained having the physical properties shown in Table VIII.

EXAMPLE 12

This example used an alpha olefin fraction containing C-14, C-16 and C-18 alpha olefins (see Table IV for properties). In all other respects, except for about a five degree lower reaction temperature it was similar to Example 11 in that the amount of the dicyclopentadiene-rich material remained the same; the amount of the C-14, C-16, and C-18 alpha olefin fraction was significantly increased to 8.5%; the amount of the refined tall oil remained the same; and the amount of added diluent (see Table VI for properties) was slightly reduced to 7.2%.

At the end of the reaction period, 520.5 grams of a base resin was obtained having the physical properties shown in Table VIII.

EXAMPLE 13

Example 12 was repeated exactly in every way except that the reaction temperature was raised to about 245° C. to about 250° C. for about 24 hours.

Unlike the earlier pair of repeated experiments (Examples 9 and 10) in which the relative degree of steam distillation utilized to recover the base resin was deliberately changed, the degree of steaming was kept relatively constant for both Examples 12 and 13.

Examples 12 and 13 are therefore attempts to almost exactly replicate experiments, except for about a five degree difference in initial reaction temperature.

At the end of the reaction period, 493.1 grams of a base resin was obtained having the physical properties shown in Table VIII.

EXAMPLE 14

This example used a different alpha olefin fraction containing C-20 to C-24 alpha olefins (see Table IV for properties). The same alpha olefin fraction was used earlier in Examples 4 and 5. It is similar to Examples 9 to 13 in that the same dicyclopentadiene-rich material was used.

Except for the different kind of alpha olefin fraction (C-20 to C-24) used here in Example 14, the proportions of dicyclopentadiene-rich fraction, alpha olefin, refined tall oil, and hydrocarbon diluent were exactly the same as in Example 13.

At the end of the reaction period, 511.7 grams of a base resin was obtained having the physical properties shown in Table VIII.

EXAMPLE 15

This example used a different alpha olefin fraction containing C-24 to C-28 alpha olefins (see Table IV for properties). In all other aspects it was similar to Example 14 in that the amount of the dicyclopentadiene-rich material remained the same and the proportions of components (b) and (c) remained the same. The amount of added diluent (Hydrocarbon Diluent No. 1—see Table VI for properties) also remained the same. The same dicyclopentadiene-rich material was used as in Example 14.

At the end of the reaction period, 586.7 grams of a base resin was obtained having the physical properties shown in Table VIII.

In each of Examples 6 through 15, a base resin was recovered with the properties shown in Table VIII; a maleic-modified hydrocarbon resin was prepared therefrom as described in Example 6; and the resulting resin was found to have the physical properties shown in Table VIII.

A typical heat-set ink formula, utilizing a maleic-modified hydrocarbon resin consists of 76% resin varnish (which in turn consists of 50 Wt.% of a maleic-modified resin in 31 Kauri butanol heat-set ink oil); 8.6% Phthalocycanine blue; 2.0% Cabosil; 2.15% polyethylene wax; and 11.25% heat-set ink oil (31 Kauri butanol value). Suitable heat-set inks utilizing the maleic-modified resins of Examples 6 to 15 may be prepared.

A typical publication gravure (type "A") formula utilizing the maleic-modified resin, consists of 50% resin varnish, (which in turn consists of 60 Wt.% of a maleic-modified resin in 42 Kauri butanol gravure ink solvent); 10% benzidene yellow; 1.5% ethylhydroxyethylcellulose (EHEC-dry basis); 5.0% polyethylene wax compound; and 33.5% gravure ink solvent (42 Kauri butanol value). Suitable gravure inks utilizing the maleic-modified resins of Examples 6 to 15 may be prepared.

In these next three examples, yet two more dicyclopentadiene rich hydrocarbon fractions were used which contained both an intermediate DCPD level (74.5%—Examples 16 and 17) and a lower DCPD level (66.4%—Example 18) compared to the earlier DCPD level (77.5%—Examples 1 to 5) and the later DCPD level (72.4%—Examples 6 to 15).

Additionally, the 74.5% DCPD feed (Examples 16 and 17) contained about 3.1% of methyl and dimethyldicyclopentadienes and about 8.9% of miscellaneous C-10–C-12 codimers; while the 66.4% DCPD feed (Example 18) contained a much larger amount, 10.6% of methyl and dimethyldicyclopentadienes, and 8.1% of miscellaneous C-10–C-12 codimers. No added diluent was used in these examples.

Table IX will show a very slight difference in composition for the DCPD-rich fractions used in Examples 16 and 17, but for purposes of the comparative discussion in the previous two paragraphs this minor difference is not considered.

TABLE VIII

COMPONENT AND PHYSICAL PROPERTY DATA FOR EXAMPLES 6-15

| | Example 6 Wt. % | Example 7 Wt. % | Example 8 Wt. % | Example 9 Wt. % | Example 10 Wt. % | Example 11 Wt. % | Example 12 Wt. % | Example 13 Wt. % | Example 14 Wt. % | Example 15 Wt. % |
|---|---|---|---|---|---|---|---|---|---|---|
| Component (a) | | | | | | | | | | |
| DCPD | 52.6 | 53.6 | 52.9 | 53.6 | 53.6 | 53.5 | 53.6 | 53.6 | 52.6 | 52.6 |
| Methyldicyclopentadiene | 3.4 | 3.4 | 2.8 | 3.4 | 3.4 | 3.4 | 3.4 | 3.4 | 3.3 | 3.3 |
| Dimethyldicyclopentadiene | 0.2 | 0.2 | 0.2 | 0.2 | 0.2 | 0.2 | 0.2 | 0.2 | 0.2 | 0.2 |
| Misc. Codimers ($C_{10}$–$C_{12}$) | 6.4 | 6.4 | 6.3 | 6.4 | 6.4 | 6.4 | 6.4 | 6.4 | 6.3 | 6.3 |
| Vinyl Norbornene | 0.2 | 0.2 | 0.1 | 0.2 | 0.2 | 0.2 | 0.2 | 0.2 | 0.2 | 0.2 |
| Methylbicyclononadienes | 0.4 | 0.4 | 0.3 | 0.4 | 0.4 | 0.4 | 0.4 | 0.4 | 0.4 | 0.4 |
| C-5's | — | — | — | — | — | — | — | — | — | — |
| Inerts | 9.4 | 9.6 | 9.4 | 9.6 | 9.6 | 9.6 | 9.7 | 9.7 | 9.5 | 9.5 |
| Styrene | 0.1 | 0.1 | 0.1 | 0.1 | 0.1 | 0.1 | 0.1 | 0.1 | 0.1 | 0.1 |
| Indene | — | — | — | — | — | — | — | — | — | — |
| Vinyltoluenes | — | — | — | — | — | — | — | — | — | — |
| | 72.9 | 73.9 | 72.1 | 73.9 | 73.9 | 73.8 | 74.0 | 74.0 | 72.6 | 72.6 |
| Component (b) | | | | | | | | | | |
| Carbon No. | 16 | 16 | 18 | 18 | 18 | 18 | 14–18 | 14–18 | 20–24 | 24–28 |
| Alpha Olefin | 5.9 | 6.8 | 10.3 | 8.6 | 8.6 | 6.9 | 8.5 | 8.5 | 8.5 | 8.5 |
| Component (c) | | | | | | | | | | |
| Refined Tall Oil | 12.4 | 10.3 | 10.4 | 10.3 | 10.3 | 10.3 | 10.3 | 10.3 | 10.1 | 10.1 |
| Hydrocarbon Diluent No. 1 | 9.0 | 9.0 | 7.2 | 7.2 | 7.2 | 9.0 | 7.2 | 7.2 | 8.8 | 8.8 |
| TOTALS | 100.0 | 100.0 | 100.0 | 100.0 | 100.0 | 100.0 | 100.0 | 100.0 | 100.0 | 100.0 |
| BASE RESINS | | | | | | | | | | |
| Physical Properties | | | | | | | | | | |
| Ring & Ball Softening Point, °C.[1] | 144 | 140 | 133 | 133 | 140 | 148 | 142 | 139 | 141 | 140 |
| Acid Number[2] | 4.5 | 4.3 | 3.9 | 3.3 | 4.7 | 4.8 | 4.4 | 4.5 | 4.5 | 5.0 |
| Resin Color[3] | 0.9 | 0.6 | 0.9 | 0.8 | 0.6 | 1.0 | 0.6 | 1.2 | 0.8 | 1.3 |
| Standard Stoddard Solubility, °C.[4] | −10/<−60 | −11/<−60 | −10/<−60 | −23/<−60 | −18/<−60 | −18/<−60 | −20/<−60 | −22/<−60 | −27/−42 | +9/+5 |
| Wijs Iodine Number | 160 | 151 | 149 | — | — | 160 | — | 156 | 150 | — |
| Base Resin Yield Wt. % (Distillation | 81.0 | 82.7 | 83.2 | 84.1 | 85.0 | 85.0 | 85.3 | 84.7 | 83.1 | 87.1 |

TABLE VIII-continued
COMPONENT AND PHYSICAL PROPERTY DATA FOR EXAMPLES 6-15

| | Example 6 Wt. % | Example 7 Wt. % | Example 8 Wt. % | Example 9 Wt. % | Example 10 Wt. % | Example 11 Wt. % | Example 12 Wt. % | Example 13 Wt. % | Example 14 Wt. % | Example 15 Wt. % |
|---|---|---|---|---|---|---|---|---|---|---|
| Charge) | | | | | | | | | | |

Test Methods:
[1] ASTM E 28.
[2] as described elsewhere in present invention
[3] modified Barrett method, using % Light Transmission (Photoelectric)
[4] temp. of indefinite and definite cloud points, using method described in U.S. Pat. Nos. 2,565,222; 3,422,053; and 3,468,837.
[5] ASTM D 1959.

MALEIC MODIFIED RESINS

| Physical Properties | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Ring & Ball Softening Point, °C.[1] | 153 | 152 | 143 | 141 | 148 | 158 | 150 | 150 | 151 | 154 |
| Gardner-Holdt Solution Viscosity at 25° C. (60% Resin in 33-34 Kauri butanol reference Oil - H.D.T.) - Bubble Seconds[2] | 275 | 447 | — | — | 275 | 2275 | 509 | 422 | 481 | 5561 |
| Hydrocarbon Dilution Tolerance (HDT) (60% Resin in 33-34 Kauri Butanol reference Oil - H.D.T.) Wt. %[3] | 164 | 156 | — | — | 201 | 136 | 168 | 131 | 151 | 95 |
| Acid Number[4] | 18.2 | 17.5 | 22.4 | 18.5 | 19.1 | 19.1 | 18.2 | 21.0 | 17.9 | 19.0 |
| Resin Color[5] | 1.6 | 0.9 | 1.0 | 0.9 | 0.8 | 1.6 | 0.9 | 1.6 | 1.3 | 1.9 |
| Standard Stoddard Solubility, °C.[6] | Hazy/+27 | +28/+19 | −8/−22 | +7/+4 | +18/+5 | Hazy/+35 | +33/+24 | Hazy/+46 | Hazy/+12 | Hazy/+86 |
| Wijs Iodine Number[7] | 150 | 141 | 134 | — | — | 149 | — | 139 | 140 | 150 |

Test Methods:
[1] ASTM E 28.
[2] Using the Gardner-Holdt Viscosity Tube Standards in ASTM D 1545.
[3]-[4] As described elsewhere in present invention.
[5] Modified Barrett Method using % Light Transmission (Photoelectric)
[6] Temp. of indefinite and definite cloud points, using method described in U.S. Pat. Nos. 2,565,222; 3,422,053; and 3,468,837
[7] ASTM D 1959.

EXAMPLE 16

In this example, (as indicated in Table IX), approximately 631 grams (700 ml.) of an initial reaction mixture consisting of approximately 65.3% of a dicyclopentadiene-rich hydrocarbon fraction; approximately 19.8% mixed nonenes; and approximately 14.9% of refined tall oil were charged to a thermal polymerization bomb and reacted for about 19 hours at a temperature of from about 245° to about 250° C. The dicyclopentadiene-rich hydrocarbon fraction contained approximately 74.5% dicyclopentadiene 3.1% methyl and dimethyldicyclopentadienes; and 8.9% miscellaneous C-10 to C-12 codimers. The mixed nonenes were a commercial grade having properties shown in Table VI.

The distilled tall oil contained approximately 50% monomeric fatty acids, approximately 8% dimerized fatty acids, approximately 6% esterified fatty acids, approximately 33% rosin acid and approximately 2% unsaponifiables. The distilled tall oil had a Gardner Color (ASTM D 1544) of about 7, an acid number of about 180, a saponification number of about 186, and a specific gravity at 25° C. of about 0.9.

At the end of the reaction period, 420.0 grams of a base resin was obtained having the physical properties shown in Table IX.

About ninety-seven parts by weight of the base resin thus obtained were reacted with about three parts by weight maleic anhydride under an inert nitrogen blanket at a temperature of from about 210° to about 230° C. for about three hours.

The resulting maleic-modified hydrocarbon resin was found to have the physical properties shown in Table IX.

EXAMPLE 17

This example, as indicated in Table IX, was intended to represent the prior art in which a component (b) was used, consisting of a blend of materials disclosed in U.S. Pat. Nos. 4,056,498 and 4,189,410, to obtain the desired base resin and acid-modified resin. See Table IX.

At the end of the reaction period, 420.0 grams of a base resin was obtained having the physical properties shown in Table IX.

This was a repeat of Example 16 in which the amount of dicyclopentadiene-rich material used was slightly reduced to 62.1%; the amount of component (b) used (a prior art blend of dimerized C-5 diene mixture (U.S. Pat. No. 4,056,498), and Debutanized Aromatic Concentrate B and C (U.S. Pat. No. 4,189,410) was increased to 23.8%; and a slightly reduced amount of refined tall oil 14.1% were charged and reacted as in Example 16.

Although the dicyclopentadiene-rich material used in this example had a slightly different composition than in Example 16, the proportions of dicyclopentadiene, methyl and dimethyldicyclopentadienes, and miscellaneous C-10–C-12 codimers remained approximately the same as in Example 16. The same tall oil was used as in Example 16.

EXAMPLE 18

This example used a C-16 alpha olefin (See Table III for properties). In other respects it was similar to Example 17 except as now indicated.

The amount of the dicyclopentadiene-rich material was considerably increased above that in Examples 16 and 17 to 73.7%; the amount of the C-16 alpha olefin was greatly reduced to 11.9%; and the amount of the refined tall oil remained approximately the same at 14.4%. No added hydrocarbon diluent was used in Examples 16, 17 or 18.

The dicyclopentadiene-rich hydrocarbon fraction used differed to a much larger degree in its percentage components than any used previously in Examples 1-17. It contained approximately 66.4% dicyclopentadiene, 10.6% methyl and dimethyldicyclopentadienes, and 8.1% miscellaneous C-10 to C-12 codimers. The C-16 alpha olefin had the properties described in Table III. The distilled tall oil had the same composition as that used in Examples 1-17.

At the end of the reaction period, 500.9 grams of a base resin was recovered with the properties shown in Table IX.

In each of the Examples 16 through 18, a base resin was recovered with the properties shown in Table IX; a maleic-modified resin was prepared therefrom as described in Example 16; and the resulting resin was found to have the physical properties shown in Table IX.

A typical heat-set ink formula, utilizing a maleic-modified hydrocarbon resin consists of 76% resin varnish (which in turn consists of 50 Wt.% of a maleic-modified resin in 31 Kauri butanol heat-set ink oil); 8.6% Phthalocyanine blue; 2.0% Cabosil; 2.15% polyethylene wax; and 11.25% heat-set ink oil (31 Kauri butanol value). Suitable heat-set inks utilizing the maleic-modified resins of Examples 16 to 18 may be prepared.

A typical publication gravure (type "A") formula utilizing the maleic-modified resin, consists of 50% resin varnish, (which in turn consists of 60 Wt.% of a maleic-modified resin in 42 Kauri butanol gravure ink solvent); 10% benzidene yellow; 1.5% ethylhydroxyethylcellulose (EHEC-dry basis); 5.0% polyethylene wax compound; and 33.5% gravure ink solvent (42 Kauri butanol value). Suitable gravure inks utilizing the maleic-modified resins of Examples 16 to 18 may be prepared.

Each of the next four examples (19-22) used as component (a) the same dicyclopentadiene-rich material. It was, however, somewhat different in composition from those used in Tables VII, VIII, and IX (See Table X for composition of component "a").

TABLE IX

COMPONENT AND PHYSICAL PROPERTY DATA FOR EXAMPLES 16-18

|  | Example 16 | Example 17 | Example 18 |
|---|---|---|---|
| Component (a) | | | |
| Dicyclopentadiene | 48.7 | 46.3 | 48.9 |
| Methyldicyclopentadiene | 1.9 | 1.9 | 7.3 |
| Dimethyldicyclopentadiene | 0.1 | 0.1 | 0.5 |
| Miscellaneous Codimers C-10–C-12) | 5.8 | 5.4 | 6.0 |
| Vinylnorbornenes | 0.1 | 0.1 | 0.4 |
| Methylbicyclononadienes | 0.3 | 0.3 | 0.4 |
| C-5's | — | — | — |
| Inerts | 8.3 | 7.9 | 10.0 |
| Styrene | 0.1 | 0.1 | 0.2 |
| Indene | — | — | — |
| Vinyltoluene | — | — | — |
|  | 65.3 | 62.1 | 73.7 |
| Component (b) | | | |
| Carbon No. | 9 | | 16 |
| Mixed Nonenes | 19.8 | | |
| Blend: | | | |
| Dimerized C-5 Diene Mixture; DAC-B and DAC-C[1] | | 23.8 | |
| Alpha Olefin | | | 11.9 |
| Component (c) | | | |
| Refined Tall Oil | 14.9 | 14.1 | 14.4 |
| Hydrocarbon Diluent No. 1 | — | — | — |
| TOTALS | 100.0 | 100.0 | 100.0 |

[1]Blended 2 parts dimerized C-5 Diene Mixture; 0.25 parts DAC-B; 0.75 parts DAC-C.

Base Resins

| | | | |
|---|---|---|---|
| Physical Properties Ring & Ball Softening Point, °C.[1] | 144 | 144 | 128 |
| Acid Number[2] | 5.6 | 4.8 | 4.5 |
| Resin Color[3] | 0.8 | 0.6 | 1.0 |
| Standard Stoddard Solubility, °C[4] | +10/ −60 | +5/ −60 | −60/ −60 |
| Wijs Iodine Number[5] | 166 | 166 | 152 |
| Base Resin Yield, Wt. % (Distillation Charge) | 72.4 | 83.9 | 81.3 |

Test Methods:
[1]ASTM E 28.
[2]As described elsewhere in present invention.
[3]Modified Barrett method, using % Light Transmission (Photoelectric).
[4]Temperature of indefinite and definite cloud points, using method described in U.S. Pat. Nos. 2,565,222; 3,422,053; and 3,468,837.
[5]ASTM D 1959.

Maleic Modified Resins

| | | | |
|---|---|---|---|
| Physical Properties Ring & Ball Softening Point, °C.[1] | 156 | 154 | 134 |
| Gardner-Holdt solution viscosity at 25° C. (60%/Wt. resin in 33-34 Kauri butanol reference oil - H.D.T.) bubble seconds[2] | 261 | 252 | — |
| Hydrocarbon Dilution Tolerance (H.D.T.) (60%/wt. resin in 33-34 Kauri butanol reference oil (H.D.T.) Wt. %[3] | 127 | 169 | — |
| Acid Number[4] | 20.2 | 17.9 | 17.9 |
| Resin Color[5] | 1.1 | 1.2 | 1.6 |
| Standard Stoddard Solubility, °C[6] | Hazy/ +51 | +28/ +20 | −27/ −60 |
| Wijs Iodine Number[7] | 151 | 153 | 143 |

Test Methods:
[1]ASTM E 28.
[2]Using the Gardner-Holdt Viscosity Tube standards in ASTM D 1545.
[3,4]As described elsewhere in present invention.
[5]Modified Barrett method, using % Light Transmission (Photoelectric)
[6]Temperature of indefinite and definite cloud points using method described in U.S. Pat. Nos. 2,565,222; 3,422,053; and 3,468,837.
[7]ASTM D 1959.

EXAMPLE 19

In this example, as indicated in Table X, approximately 650 grams of an initial reaction mixture consisting of approximately 72.0% of a dicyclopentadiene-rich hydrocarbon fraction; approximately 10.0% of C-18 alpha olefins; approximately 10.0% of refined tall oil; and approximately 8.0% of Hydrocarbon Diluent No. 1 (See Table VI for properties) were charged to a thermal polymerization bomb and reacted for about 24 hours at about 240° C. to about 245° C. The diluent used was a by-product from a petroleum resin polymerization process.

The dicyclopentadiene-rich fraction contained approximately 73.9% DCPD; approximately 5.0% methyl and dimethyldicyclopentadienes; and approximately 9.0% miscellaneous C-10–C-12 codimers. The C-18 alpha olefin was a commercial grade having properties listed in Table III. The distilled tall oil was the same as that described in Example 1.

At the end of the reaction period, 500.1 grams of a base resin was obtained having the physical properties shown in Table X.

About ninety-seven parts by weight of the base resin thus obtained were reacted with about three parts by weight of maleic anhydride under an inert nitrogen blanket at a temperature of about 210° C. to about 230° C. for about three hours.

The resulting maleic-modified hydrocarbon resin was found to have the physical properties shown in Table X.

EXAMPLE 20

In this example, as indicated in Table X, the same materials were used and the same procedure was followed as in Example 19 except that the proportion of C-18 alpha olefin in the 650 grams initial reaction mixture was reduced to approximately 8.0% and the amount of Hydrocarbon Diluent No. 1 (See Table VI for properties) was increased to approximately 10.0%. The diluent was a by-product from a petroleum resin polymerization process. The thermal polymerization bomb temperature was increased about 5° C.

At the end of the reaction period, 509.0 grams of a base resin was obtained having the physical properties shown in Table X.

EXAMPLE 21

In this example, as indicated in Table X, approximately 650 grams of an initial reaction mixture consisting of approximately 72.0% of a dicyclopentadiene-rich hydrocarbon fraction; approximately 8.0% C-20 to C-24 alpha olefin fraction; approximately 10.0% refined tall oil; and approximately 10.0% of Hydrocarbon Diluent No. 1 (See Table VI for properties) were charged to a thermal polymerization bomb and reacted for about 22 hours at about 240° to about 245° C. The diluent was a by-product from a petroleum resin polymerization process.

The dicyclopentadiene-rich fraction contained approximately 73.9% dicyclopentadiene; approximately 5.0% methyl and dimethyldicyclopentadienes; and approximately 9.0% of miscellaneous C-10–C-12 codimers. The C-20 to C-24 alpha olefin fraction was a commercial grade having properties listed in Table IV. The distilled tall oil was the same as that described in Example 1.

At the end of the reaction period, 508.4 grams of a base resin was obtained having the physical properties shown in Table X.

EXAMPLE 22

This example was a repeat of Example 21, except that a C-24 to C-28 alpha olefin fraction (described in Table IV) was substituted for the C-20 to C-24 alpha olefin fraction. Other materials were kept the same and the same weight proportions were used.

The reaction time in the thermal polymerization bomb was increased to about 24 hours.

At the end of the reaction period, 510.8 grams of a base resin was obtained having the physical properties shown in Table X.

In each of Examples 19 through 22, a base resin was recovered with the properties shown in Table X; a maleic-modified hydrocarbon resin was prepared therefrom as described in Example 19; and the resulting resin was found to have the physical properties shown in Table X.

A typical heat-set ink formula, utilizing a maleic-modified hydrocarbon resin consist of 76% resin varnish (which in turn consists of 50 Wt.% of a maleic-modified resin in 31 Kauri butanol heat-set ink oil); 8.6% Phthalocycanine blue; 2.0% Cabosil; 2.15% polyethylene wax; and 11.25% heat-set ink oil (31 Kauri butanol value). Suitable heat-set inks utilizing the maleic-modified resins of Examples 19 to 22 may be prepared.

A typical publication gravure (type "A") formula utilizing the maleic-modified resin, consists of 50% resin varnish, (which in turn consists of 60 Wt.% of a maleic-modified resin in 42 Kauri butanol gravure ink solvent); 10% benzidene yellow; 1.5% ethylhydroxyethylcellulose (EHEC-dry basis); 5.0% polyethylene wax compound; and 33.5% gravure ink solvent (42 Kauri butanol value). Suitable gravure inks utilizing the maleic-modified resins of Examples 19 to 22 may be prepared.

TABLE X

COMPONENT AND PHYSICAL PROPERTY DATA FOR EXAMPLES 19-22

|  | Example 19 | Example 20 | Example 21 | Example 22 |
| --- | --- | --- | --- | --- |
| Component (a) | Wt. % | Wt. % | Wt. % | Wt. % |
| DCPD | 53.2 | 53.2 | 53.2 | 53.2 |
| Methyldicyclopentadiene | 3.4 | 3.4 | 3.4 | 3.4 |
| Dimethyldicyclopentadiene | 0.2 | 0.2 | 0.2 | 0.2 |
| Miscellaneous Codimers ($C_{10}$-$C_{12}$) | 6.5 | 6.5 | 6.5 | 6.5 |
| Vinylnorbornenes | 0.3 | 0.3 | 0.3 | 0.3 |
| Methyldicyclononadienes | 0.1 | 0.1 | 0.1 | 0.1 |
| C-5's | 5.9 | 5.9 | 5.9 | 5.9 |
| Inerts | 2.3 | 2.3 | 2.3 | 2.3 |
| Styrene | 0.1 | 0.1 | 0.1 | 0.1 |
| Indene | — | — | — | — |
| Vinyltoluenes | — | — | — | — |
|  | 72.0 | 72.0 | 72.0 | 72.0 |
| Component (b) |  |  |  |  |
| Carbon No. | 18 | 18 | 20–24 | 24–28 |
| Alpha Olefin | 10.0 | 8.0 | 8.0 | 8.0 |
| Component (c) |  |  |  |  |
| Refined Tall Oil | 10.0 | 10.0 | 10.0 | 10.0 |

TABLE X-continued

COMPONENT AND PHYSICAL PROPERTY DATA FOR EXAMPLES 19-22

| | Example 19 | Example 20 | Example 21 | Example 22 |
|---|---|---|---|---|
| Hydrocarbon Diluent No. 1 | 8.0 | 10.0 | 10.0 | 10.0 |
| TOTALS | 100.0 | 100.0 | 100.0 | 100.0 |
| Base Resins | | | | |
| Physical Properties | | | | |
| Ring & Ball Softening Point, °C.[1] | 139 | 141 | 147 | 140 |
| Gardner-Holdt Solution Viscosity at 25° C. (60% resin in 42 Kauri butanol gravure ink solvent (bubble seconds) | 1.8 → 2.15 | 2.65 → 3.2 | 3.2 → 4.0 | 4.0 → 5.0 |
| Gardner-Holdt Solution Viscosity at 25° C. (50% resin in 30 Kauri butanol ink oil - Magie 470) bubble seconds[3] | 9.0 | 12.4 | 18.7 | 13.6 |
| Acid Number[4] | 3.1 | 4.6 | 5.3 | 5.0 |
| Resin Color (Gardner)[5] | 14 | 13+ | 16 | 13+ |
| Standard Stoddard Solubility, °C.[6] | −25/−58 | −10/−56 | 0/−38 | +75/+8 |
| Wijs Iodine Number[7] | 147 | 152 | 150 | 152 |
| Molecular Weight (No. Average)[8] | 1208 | 1023 | 1193 | 908 |
| Resin Aniline Point, °C.[9] | — | 63.0 | 66.0 | 68.0 |
| Base Resin Yield - Wt. % (Distillation Charge) | 80.6 | 83.0 | 83.8 | 83.9 |

Test Methods:
[1]ASTM E 28.
[2,3]Using the Gardner-Holdt Viscosity Tube Standards in ASTM D 1545.
[4]As described elsewhere in present invention
[5]ASTM D 1544
[6]Temp. of indefinite and definite cloud points, using method described in U.S. Pat. Nos. 2,565,222; 3,422,053; and 3,468,837.
[7]ASTM D 1959
[8]ASTM D 2503
[9]ASTM D 1012

| Maleic Modified Resins | | | | |
|---|---|---|---|---|
| Physical Properties | | | | |
| Ring & Ball Softening Point, °C.[1] | 148 | 151 | 154 | 149 |
| Gardner-Holdt Solution Viscosity at 25° C. (60%/Wt. resin in 33-34 Kauri butanol reference oil - H.D.T) bubble seconds[2] | 356 | 631 | 1220 | 1700 |
| Gardner-Holdt Solution Viscosity at 25° C. (60% resin in 42 Kauri butanol gravure ink solvent) - bubble seconds[3] | 2.65-3.1 | 4.0-5.0 | 6.0-8.0 | 6.3-8.0 |
| Gardner-Holdt Solution Viscosity at 25° C. (50% resin in 30 Kauri butanol ink oil - Magie 470) - bubble seconds | 19.9 | 28.3 | 41.1 | 69.4 |
| Hydrocarbon Dilution Tolerance (H.D.T.)(60%/wt. resin in 33-34 Kauri butanol reference oil - H.D.T.) Wt. %[5] | 213 | 158 | 132 | 87 |
| Acid Number[6] | 16.8 | 21.0 | 20.5 | 19.0 |
| Standard Stoddard Solubility, °C.[7] | Hazy/−52 | Hazy/+14 | Cloudy/+40 | Hazy/+55 |
| Wijs Iodine Number[8] | 139 | 142 | 138 | 143 |
| Molecular Weight (No. Average)[9] | 1203 | 1024 | 1345 | 871 |

Test Methods:
[1]ASTM E 28.
[2,3,4]Using the Gardner-Holdt Viscosity Tube Standards in ASTM D 1545.
[5,6]As described elsewhere in present invention.
[7]Temperature of indefinite and definite cloud points using method described in U.S. Pat. Nos. 2,565,222; 3,422,053; and 3,468,837.
[8]ASTM D 1959.
[9]ASTM D 2503.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A composition comprising:
   (a) a predominant amount of dicyclopentadiene; and lesser amounts of
   (b) at least one hydrocarbon selected from the group consisting of mono-olefins, diolefins, and polyenes each having more than five carbon atoms, and having no aromatic rings; and
   (c) at least one member selected from the group consisting of fatty acid-containing materials and rosin acid-containing materials.

2. The composition of claim 1 comprising:
   (a) from about forty to about eighty-five percent, by weight, of dicyclopentadiene or a dicyclopentadiene-rich hydrocarbon fraction containing at least about seventy percent, by weight, of dicyclopentadiene or a dicyclopentadiene-rich hydrocarbon fraction containing at least about seventy percent, by weight, dicyclopentadiene and minor amounts of dimethyldicyclopentadiene and codimers of cyclopentadiene and methylcyclopentadiene;

(b) from about five to about forty percent, by weight, of at least one hydrocarbon selected from the group consisting of mono-olefins, diolefins, and polyenes each having more than five carbon atoms, and having no aromatic rings; and (c) from about five to about thirty percent, by weight, of at least one member selected from the group consisting of fatty acid-containing materials and rosin acid-containing materials.

3. The composition of claim 1, wherein said composition is reacted and has a Ring and Ball softening point of from about 100° C. to about 170° C.; Gardner-Holdt solution viscosities at 25° C. (bubble seconds) of from about 0.90 to about 15.0 (60%/Wt. resin in 42 Kauri butanol gravure ink solvent) and from about 8.00 to about 100 (50%/Wt. resin in Magie 470 oil); a definite Stoddard solubility from less than about −60° C. to about 40° C.; and an Acid Number of from about 1.5 to about 10.0.

4. The composition of claim 1, wherein said composition is reacted and has a Ring and Ball softening point of from about 125° C. to about 150° C.; Gardner-Holdt solution viscosities at 25° C. (bubble seconds) of from about 1.15 to about 8.00 (60%/Wt. resin in 42 Kauri butanol gravure ink solvent) and of from about 10 to about 50 (50%/Wt. resin in Magie 470 oil); a definite Stoddard solubility from about −50° C. to about +20° C.; and an Acid Number of from about 3.0 to about 7.0.

5. A process for producing the composition of claim 1, in a reacted form comprising reacting:
(a) a predominant amount of dicyclopentadiene; and lesser amounts of
(b) at least one hydrocarbon selected from the group consisting of mono-olefins, diolefins, and polyenes each having more than 5 carbon atoms, and having no aromatic rings; and
(c) at least one member selected from the group consisting of fatty acid-containing materials and rosin acid-containing materials.

6. A composition comprising:
(a) a predominant amount of dicyclopentadiene; and lesser amounts of
(b) at least one hydrocarbon selected from the group consisting of mono-olefins, diolefins, and polyenes each having more than 5 carbon atoms, and having no aromatic rings;
(c) at least one member selected from the group consisting of fatty acid-containing materials and rosin acid-containing materials; and
(d) at least one ethylenically unsaturated lower aliphatic dicarboxylic acid or anhydride.

7. The composition of claim 6 comprising:
(a) from about forty to about eighty-five percent, by weight, of dicyclopentadiene or a dicyclopentadiene-rich hydrocarbon fraction containing at least about seventy percent, by weight, dicyclopentadiene and minor amounts of dimethyldicyclopentadiene and codimers of cyclopentadiene and methylcyclopentadiene;
(b) from about five to about forty percent, by weight, of at least one hydrocarbon selected from the group consisting of mono-olefins, diolefins, and polyenes each having more than five carbon atoms, and having no aromatic rings;
(c) from about five to about thirty percent, by weight, of at least one member selected from the group consisting of fatty acid-containing materials and rosin acid-containing materials; and
(d) from about one to about ten percent, by weight, maleic anhydride.

8. The composition of claim 6, wherein said composition is reacted and has a Ring and Ball softening point of from about 110° C. to 180° C.; Gardner-Holdt solution viscosities at 25° C. (bubble seconds) of from about 10 to about 10,000 (60%/Wt. resin in 33–34 Kauri butanol reference oil-H.D.T.); a Hydrocarbon Dilution Tolerance test value (solubility-Wt %) of from about 25 to about 1000 (60%/Wt. resin in 33–34 Kauri butanol reference oil-H.D.T.); and an Acid Number of from about 10 to about 40.

9. The composition of claim 6, wherein said composition is reacted and has a Ring and Ball softening point from about 130° C. to about 175° C.; a Gardner-Holdt solution viscosity at 25° C. (bubble seconds) of from about 100 to about 2,000 (60%/Wt. resin in 33–34 Kauri butanol reference oil-H.D.T.); a Hydrocarbon Dilution Tolerance test value (solubility-Wt. %) of from about 50 to about 600 (60%/Wt. resin in 33–34 Kauri butanol reference oil-H.D.T.); and an Acid Number of from about 10 to about 30.

10. The composition of claim 6, wherein said composition is reacted and has a Ring and Ball softening point of from about 140° C. to about 160° C.; a Gardner-Holdt solution viscosity at 25° C. (bubble seconds) of from about 200 to about 1,200 (60%/Wt. resin in 33–34 Kauri butanol reference oil-H.D.T.); a Hydrocarbon Dilution Tolerance test value (solubility-Wt. %) of from about 125 to about 250 (60%/Wt. resin in 33–34 Kauri butanol reference oil-H.D.T.); and an Acid Number of from about 15 to about 25.

11. The composition of claims 1 or 6 wherein component (b) is a mono-olefin selected from the group consisting of acyclic mono-olefins (alpha olefins); acyclic mono-olefins (non alpha olefins); simple cyclic mono-olefins; bicyclic mono-olefins; bicyclic mono-olefins (Spiro type); and polycyclic mono-olefins: four types.

12. The composition of claim 11 wherein component (b) is at least one member selected from the group consisting of 1-tetradecene; 1-hexadecene; 1-octadecene; and 1-eicosene.

13. The composition of claim 11 wherein component (b) is an acyclic mono-olefin (non-alpha olefin) selected from the group consisting of 2,2,4-trimethyl-2-pentene; 2,3,4-trimethyl 3-hexene; 7-tetradecene; and 5-eicosene.

14. The composition of claim 11 wherein component (b) is a simple cyclic mono-olefin selected from the group consisting of cyclotetradecene; cyclohexadecene; and cyclooctadecene.

15. The composition of claims 1 or 6 wherein component (b) is a diolefin selected from the group consisting of acyclic conjugated dienes; acyclic non-conjugated dienes; simple cyclic conjugated diolefins; bicyclic conjugated diolefins; polycyclic conjugated diolefins; simple cyclic non-conjugated diolefins; bicyclic non-conjugated diolefins; and polycyclic non-conjugated diolefins.

16. The composition of claim 15 wherein component (b) is an acyclic conjugated diene or acyclic non-conjugated diene selected from the group consisting of 1,3-hexadecadiene; 7,11,15-trimethyl-3-methylene-1-hexadecadiene; 4,4,7,7-tetramethyl-1-9 decadiene, and 1,19-eicosadiene.

17. The composition of claim 15 wherein component (b) is a simple cyclic conjugated or simple cyclic non-conjugated diolefin selected from the group consisting of 1,9-cyclohexadecadiene, and 1,10-cyclooctadecadiene.

18. The composition of claims 1 or 6 wherein component (b) is a polyene selected from the group consisting of acyclic conjugated polyenes; acyclic non-conjugated polyenes; simple cyclic conjugated polyenes; bicyclic conjugated polyenes, polycyclic conjugated polyenes; simple cyclic non-conjugated polyenes; bicyclic non-conjugated polyenes; and polycyclic non-conjugated polyenes.

19. The composition of claim 18 wherein component (b) is an acyclic conjugated or acyclic non-conjugated polyene selected from the group consisting of 1,6,10,14-hexadecatetraene and 1,8,11-octadecatriene.

20. The composition of claim 18 wherein component (b) is a simple cyclic conjugated or simple cyclic non-conjugated polyene selected from the group consisting of 3-methyl-1-(2,5,6 trimethyl-1-cyclohexen-1-yl)-1,3,5-hexatriene; 1,3,10,12-cyclooctadecatetraene; 1,5,9-cyclododecatriene; and 1,5,9,13 cyclohexadecatetraene.

21. A process for producing the composition of claim 6, in a reacted form, comprising reacting:
(a) a predominant amount of dicyclopentadiene; and lesser amounts of
(b) at least one hydrocarbon selected from the group consisting of mono-olefins, diolefins and polyenes each having more than five carbon atoms, and having no aromatic rings;
(c) at least one member selected from the group consisting of fatty acid-containing materials and rosin acid-containing materials; and
(d) at least one ethylenically unsaturated lower aliphatic dicarboxylic acid or anhydride.

22. A composition comprising a polymerized mixture of:
(a) a predominant amount of dicyclopentadiene; and lesser amounts of
(b) at least one hydrocarbon selected from the group consisting of mono-olefins, diolefins, and polyenes each having more than five carbon atoms, and having no aromatic rings; and
(c) at least one member selected from the group consisting of fatty acid-containing materials and rosin acid-containing materials;
wherein said composition has a Ring and Ball softening point of from about 100° C. to about 170° C.; Gardner-Holdt solution viscosities at 25° C. (bubble seconds) of from about 0.50 to about 15.0 (60%/Wt. resin in 42 Kaur ibutanol gravure ink solvent) and of from about 8.00 to about 100 (50%/Wt. resin in Magie 470 oil); a definite Stoddard solubility from less than about −60° C. to about 40° C.; and an Acid Number of from about 1.5 to about 10.0.

23. A process for producing the composition of claim 22 comprising co-polymerizing a reaction mixture comprising: components (a), (b) and (c).

24. A composition comprising the reaction product of:
(a) a predominant amount of dicyclopentadiene and lesser amounts of
(b) at least one hydrocarbon selected from the group consisting of mono-olefins, diolefins, and polyenes each having more than five carbon atoms, and having no aromatic rings;
(c) at least one member selected from the group consisting of fatty acid-containing materials and rosin acid-containing materials; and
(d) at least one ethylenically unsaturated lower aliphatic dicarboxylic acid or anhydride,
wherein said composition has a Ring and Ball softening point of from about 110° C. to about 180° C.; a Gardner-Holdt solution viscosity at 25° C. (bubble seconds) of from about 10 to about 10,000 (60%/Wt. resin in 33–34 Kauri butanol reference oil-H.D.T.); a Hydrocarbon Dilution Tolerance test value (Solubility-Wt. %) of from about 25 to about 1000 (60%/Wt. resin in 33–34 Kauri butanol reference oil H.D.T.); and an Acid Number of from about 10 to about 40.

25. A process for producing the composition of claim 24 comprising reacting components (a), (b), (c) and (d).

26. The process of claim 25 wherein components (a), (b), (c) and (d) are reacted simultaneously in a one-step reaction process.

27. The process of claim 25, which process comprises: (1) co-polymerizing a reaction mixture comprising components (a), (b) and (c) to form a base resin, and (2) reacting the base resin with component (d).

28. The process of claims 23 or 25 wherein the reaction includes one or more aromatic olefinic monomers selected from the group consisting of vinyltoluenes, styrene, alpha-methylstyrene, indene, coumarone, methyl coumarones, dimethylstyrenes and methylindenes.

29. The composition of claim 2 comprising:
(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers of cyclopentadiene and methylcyclopentadiene;
(b) from about five to about forty percent, by weight, of at least one hydrocarbon selected from the group consisting of mono-olefins, diolefins, and polyenes each having more than five carbon atoms, and having no aromatic rings; and
(c) from about five to about thirty percent, by weight, of at least one member selected from the group consisting of fatty acid-containing materials and rosin acid-containing materials.

30. The composition of claim 7 comprising:
(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers of cyclopentadiene and methylcyclopentadiene;
(b) from about five to about forty percent, by weight, of at least one hydrocarbon selected from the group consisting of mono-olefins, diolefins, and polyenes each having more than five carbon atoms, and having no aromatic rings;
(c) from about five to about thirty percent, by weight, of at least one member selected from the group consisting of fatty acid-containing materials and rosin acid-containing materials; and
(d) from about one to about ten percent, by weight, maleic anhydride.

31. A process for producing the composition of claim 29, in a reacted form comprising reacting:

(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers of cyclopentadiene and methylcyclopentadiene;

(b) from about five to about forty percent, by weight, of at least one hydrocarbon selected from the group consisting of mono-olefins, diolefins, and polyenes each having more than five carbon atoms, and having no aromatic rings; and (c) from about five to about thirty percent, by weight, of at least one member selected from the group consisting of fatty acid-containing materials and rosin acid-containing materials.

32. A process for producing the composition of claim 30, in a reacted form, comprising reacting:

(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers and cyclopentadiene and methylcyclopentadiene;

(b) from about five to about forty percent, by weight, of at least one hydrocarbon selected from the group consisting of mono-olefins, diolefins, and polyenes each having more than five carbon atoms, and having no aromatic rings;

(c) from about five to about thirty percent, by weight, of at least one member selected from the group consisting of fatty acid-containing materials and rosin acid-containing materials; and (d) from about one to about ten percent, by weight, maleic anhydride.

33. A composition consisting essentially of:

(a) a predominant amount of dicyclopentadiene; and lesser amounts of (b) at least one hydrocarbon selected from the group consisting of mono-olefins, diolefins, and polyenes each having more than five carbon atoms, and having no aromatic rings; and (c) at least one member selected from the group consisting of fatty acid-containing materials and rosin acid-containing materials.

34. The composition of claim 33 consisting essentially of:

(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers of cyclopentadiene and methylcyclopentadiene;

(b) from about five to about forty percent, by weight, of at least one hydrocarbon selected from the group consisting of mono-olefins, diolefins, and polyenes each having more than five carbon atoms, and having no aromatic rings; and (c) from about five to about thirty percent, by weight, of at least one member selected from the group consisting of fatty acid-containing materials and rosin acid-containing materials.

35. A process for producing the composition of claim 33, in a reacted form, consisting essentially of reacting:

(a) a predominant amount of dicyclopentadiene; and lesser amounts of (b) at least one hydrocarbon selected from the group consisting of mono-olefins, diolefins, and polyenes each having more than five carbon atoms, and having no aromatic rings; and (c) at least one member selected from the group consisting of fatty acid-containing materials and rosin acid-containing materials.

36. A composition consisting essentially of:

(a) a predominant amount of dicyclopentadiene; and lesser amounts of (b) at least one hydrocarbon selected from the group consisting of mono-olefins, diolefins, and polyenes each having more than 5 carbon atoms, and having no aromatic rings;

(c) at least one member selected from the group consisting of fatty acid-containing materials and rosin acid-containing materials; and (d) at least one ethylenically unsaturated lower aliphatic dicarboxylic acid or anhydride.

37. The composition of claim 36 consisting essentially of:

(a) from about forty to about eighty-five percent, by weight, of dicyclopentadiene or a dicyclopentadiene-rich hydrocarbon fraction containing at least about forty percent, by weight, dicyclopentadiene and minor amounts of dimethyldicyclopentadiene and codimers of cyclopentadiene and methylcyclopentadiene;

(b) from about five to about forty percent, by weight, of at least one hydrocarbon selected from the group consisting of mono-olefins, diolefins, and polyenes each having more than five carbon atoms, and having no aromatic rings;

(c) from about five to about thirty percent, by weight, of at least one member selected from the group consisting of fatty acid-containing materials and rosin-acid containing materials; and (d) from about one to about ten percent, by weight, maleic anhydride.

38. A process for producing the composition of claim 36, in a reacted form, consisting essentially of reacting:

(a) a predominant amount of dicyclopentadiene; and lesser amounts of (b) at least one hydrocarbon selected from the group consisting of mono-olefins, diolefins, and polyenes each having no more than 5 carbon atoms, and having no aromatic rings;

(c) at least one member selected from the group consisting of fatty acid-containing materials and rosin acid-containing materials; and (d) at least one ethylenically unsaturated lower aliphatic dicarboxylic acid or anhydride.

39. The composition of claim 33 wherein component (b) is a mono-olefin selected from the group consisting of acyclic mono-olefins (alpha olefins); acyclic mono-olefins (non alpha olefins); simple cyclic mono-olefins; bicyclic mono-olefins; bicyclic mono-olefins (Spiro type); and polycyclic mono-olefins: four types.

40. The composition of claim 36 wherein component (b) is a mono-olefin selected from the group consisting of acyclic mono-olefins (alpha olefins); acyclic mono-olefins (non alpha olefins); simple cyclic mono-olefins; bicyclic mono-olefins (Spiro type); and polycyclic mono-olefins: four types.

* * * * *